United States Patent
Haverinen et al.

(10) Patent No.: US 10,462,633 B2
(45) Date of Patent: Oct. 29, 2019

(54) BLUETOOTH BASED MOTION DETECTION SYSTEMS

(71) Applicant: QUALCOMM Incorporated, San Diego, CA (US)

(72) Inventors: Anssi Haverinen, San Diego, CA (US); Xiaoxin Zhang, Sunnyvale, CA (US); Ning Zhang, Saratoga, CA (US); Sandeep Kesireddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/621,914

(22) Filed: Jun. 13, 2017

(65) Prior Publication Data

US 2018/0262866 A1 Sep. 13, 2018

Related U.S. Application Data

(60) Provisional application No. 62/470,186, filed on Mar. 10, 2017.

(51) Int. Cl.
*H04B 7/00* (2006.01)
*H04W 4/80* (2018.01)
(Continued)

(52) U.S. Cl.
CPC .......... *H04W 4/80* (2018.02); *H04B 7/0822* (2013.01); *H04B 17/12* (2015.01); *H04B 17/20* (2015.01);
(Continued)

(58) Field of Classification Search
CPC ..... H04W 4/008; H04W 84/12; H04W 84/18; H04B 7/0822; H04L 67/12
(Continued)

(56) References Cited

U.S. PATENT DOCUMENTS 8,965,284 B2 2/2015 Honkanen et al.
9,300,925 B1 * 3/2016 Zhang .................... H04N 7/181
(Continued)

OTHER PUBLICATIONS

Sugino K., et al., "Developing a Human Motion Detector using Bluetooth Beacons and its Applications", Nagoya Institute of Technology, Information Engineering Express International Institute of Applied Informatics, vol. 1, No. 4, 2015, pp. 95-105.
(Continued)

*Primary Examiner* — Edward F Urban
*Assistant Examiner* — Max Mathew
(74) *Attorney, Agent, or Firm* — Paradice and Li LLP

(57) ABSTRACT

This disclosure provides systems, methods and apparatuses for detecting motion based on wireless signals. In some implementations, a receiving device may receive, from a transmitting device, a packet containing a sequence. In some aspects, the packet may be a Bluetooth packet, and the sequence may be contained in a supplemental information appended to the Bluetooth packet. The receiving device may estimate angle information of the packet based on the sequence, and determine a difference between the estimated angle information and a reference angle. The angle information may be an angle of arrival (AoA) or an angle of departure (AoD) of the packet. The receiving device may detect motion based on the determined difference.

26 Claims, 12 Drawing Sheets

(51) Int. Cl.
*H04B 17/20* (2015.01)
*H04B 7/08* (2006.01)
*H04W 4/02* (2018.01)
*H04B 17/12* (2015.01)
*H04L 29/08* (2006.01)
*H04W 84/12* (2009.01)
*H04W 84/18* (2009.01)

(52) U.S. Cl.
CPC .............. *H04W 4/02* (2013.01); *H04L 67/12* (2013.01); *H04W 84/12* (2013.01); *H04W 84/18* (2013.01)

(58) Field of Classification Search
USPC ........................................................ 455/41.2
See application file for complete search history.

(56) References Cited

U.S. PATENT DOCUMENTS

| | | | |
|---|---|---|---|
| 9,311,793 B2 | 4/2016 | Lohbihler | |
| 9,524,628 B1 | 12/2016 | Omer et al. | |
| 9,702,963 B2 * | 7/2017 | Kalliola | G01S 5/02 |
| 2002/0097184 A1 * | 7/2002 | Mayersak | G01S 3/54 |
| | | | 342/458 |
| 2011/0270567 A1 * | 11/2011 | Mow | H04B 17/0087 |
| | | | 702/120 |
| 2013/0321209 A1 * | 12/2013 | Kalliola | G01S 5/02 |
| | | | 342/419 |
| 2015/0019131 A1 * | 1/2015 | Basir | G01C 21/26 |
| | | | 701/526 |
| 2015/0050907 A1 * | 2/2015 | Rudow | H04W 4/90 |
| | | | 455/404.2 |
| 2015/0189619 A1 | 7/2015 | Kalliola et al. | |
| 2016/0377703 A1 | 12/2016 | Pais et al. | |
| 2017/0018128 A1 * | 1/2017 | Berezin | G07C 9/00111 |
| 2017/0208564 A1 * | 7/2017 | Lee | H04W 4/80 |
| 2017/0303071 A1 * | 10/2017 | Haverinen | G01S 3/46 |
| 2018/0017661 A1 * | 1/2018 | Morioka | G01S 5/0236 |
| 2018/0348332 A1 * | 12/2018 | Kautz | G01S 5/021 |

OTHER PUBLICATIONS

International Search Report and Written Opinion—PCT/US2018/014907—ISA/EPO—dated May 3, 2018.

* cited by examiner

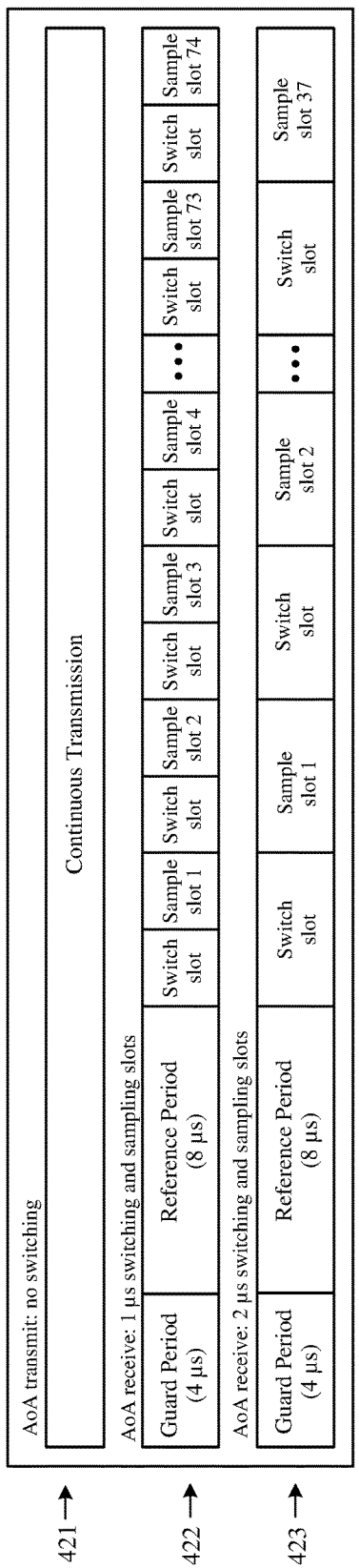
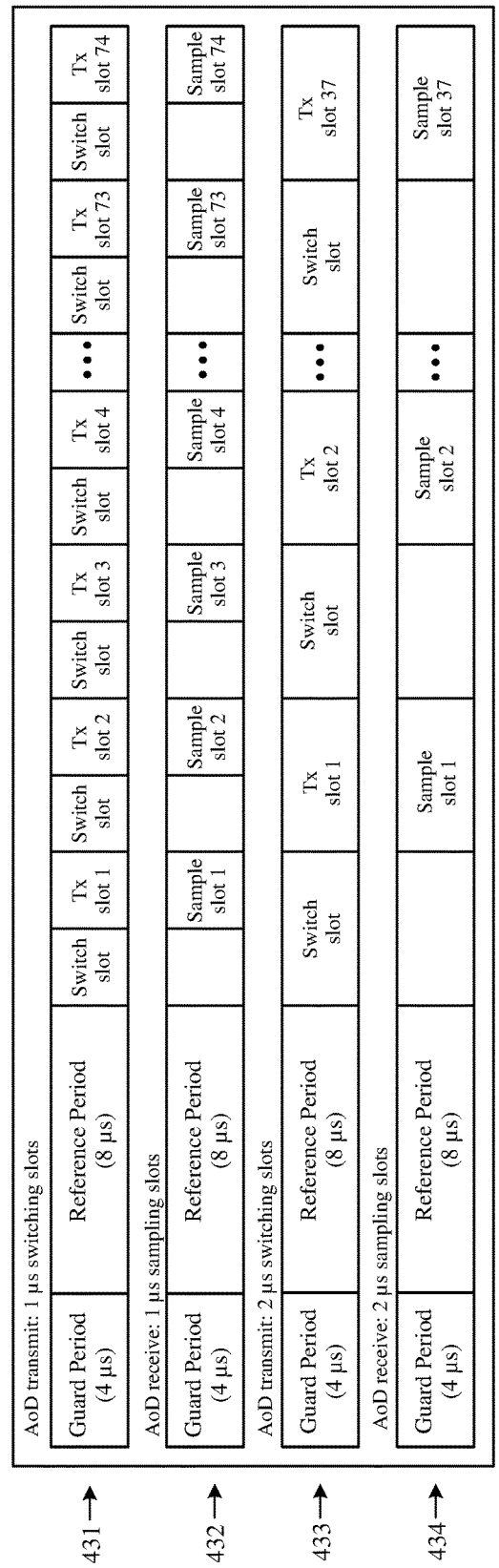
Figure 4C
Figure 4D

BLUETOOTH BASED MOTION DETECTION SYSTEMS

PRIORITY INFORMATION

This application claims the benefit of commonly owned U.S. Provisional Patent Application No. 62/470,186 entitled "BT AOA/AOD BASED MOTION DETECTION SYSTEMS," filed 10 Mar. 2017, the entirety of which is hereby incorporated by reference.

TECHNICAL FIELD

This disclosure relates generally to wireless networks, and specifically to detecting motion based on wireless signals in a personal area network.

DESCRIPTION OF THE RELATED TECHNOLOGY

A wireless local area network (WLAN) may be formed by one or more access points (APs) that provide a shared wireless medium for use by a number of client devices. Each AP, which may correspond to a Basic Service Set (BSS), periodically broadcasts beacon frames to enable compatible client devices within wireless range of the AP to establish and maintain a communication link with the WLAN. WLANs that operate in accordance with the IEEE 802.11 family of standards are commonly referred to as Wi-Fi networks, and client devices that communicate with the AP in a Wi-Fi network may be referred to as wireless stations (STAs).

Bluetooth technology also allows a number of wireless devices to communicate with each other using radio-frequency signals. Although similar in some aspects to Wi-Fi devices, Bluetooth devices typically communicate with each other without the presence of an AP (or other central controller). In addition, although Bluetooth devices typically have shorter wireless ranges than Wi-Fi devices, Bluetooth radios are less expensive and consume less power than Wi-Fi radios. As a result, Bluetooth technology is particularly well suited for applications (such as the Internet of Things) in which minimizing power consumption may be more important than achieving high data rates.

The Internet of Things (IoT) may refer to a communication system in which a wide variety of objects and devices wirelessly communicate with each other. Although many IoT devices such as smart appliances, smart televisions, and smart thermostats support both Wi-Fi and Bluetooth communication protocols, some IoT devices such as TV remote controls, sensors, and other battery powered devices may only support Bluetooth communications, for example, to minimize power consumption.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless network to detect motion using wireless signals. In some implementations, a receiving device can receive, from a transmitting device, a packet containing a sequence. The sequence can be any suitable sequence or pattern that is known to the receiving device. In some implementations, the packet can be a Bluetooth packet, and the sequence can be contained in a supplemental information that is appended to the Bluetooth packet. The receiving device can estimate angle information of the packet based on the sequence. The angle information can include an angle of arrival (AoA) of the packet, an angle of departure (AoD) of the packet, or both the AoA and the AoD of the packet.

The receiving device can determine a difference between the estimated angle information and a reference angle. The reference angle can be stored in the receiving device prior to motion detection operations. In some aspects, the reference angle can be determined during a calibration operation. In other aspects, the reference angle can be determined during one or more previous motion detection operations. The receiving device can detect motion based on the determined difference between the estimated angle information and the reference angle. In some implementations, the receiving device can detect a presence of motion based on the difference being greater than or equal to a value, and can detect an absence of motion based on the difference being less than the value.

In some implementations, the receiving device can determine a direction of motion based on differences in estimated angle information. In some aspects, the receiving device can determine first angle information for a first packet received at a first time, and can determine second angle information for a second packet received at a second time. The receiving device can determine a change in angle information between the first and second times, for example, by determining a difference between the first angle information and the second angle information. The receiving device can determine the direction of motion based on the determined difference in angle information.

In some implementations, the receiving device can perform one or more operations based on at least one of the detected motion and the determined direction of motion. In some aspects, the one or more operations can be based on whether there is a presence of motion in the vicinity of the receiving device or the transmitting device. In other aspects, the one or more operations can be based on a direction of motion (such as the direction in which a person is walking) in the vicinity of the receiving device or the transmitting device. In some other aspects, the one or more operations can be based on the detection of motion and the direction of motion. In addition, or in the alternative, the receiving device can send, to the transmitting device, a command to perform one or more operations based on at least one of the detected motion and the determined direction of motion.

Another innovative aspect of the subject matter described in this disclosure can be implemented as a method for motion detection using wireless signals. The method can include receiving, from a transmitting device, a packet containing a sequence; estimating angle information of the packet based on the sequence; determining a difference between the estimated angle information and a reference angle; and detecting motion based on the determined difference. In some implementations, the method also can include performing one or more operations based on at least one of the detected motion and the determined direction of motion. In addition, or in the alternative, the method also can include sending, to the transmitting device, a command to perform one or more operations based on at least one of the detected motion and the determined direction of motion.

Another innovative aspect of the subject matter described in this disclosure can be implemented in a non-transitory computer readable medium. The non-transitory computer-readable medium can comprise instructions that, when executed by an apparatus, cause the apparatus to perform a number of operations for detecting motion using wireless signals. The number of operations can include receiving, from a transmitting device, a packet containing a sequence; estimating angle information of the packet based on the sequence; determining a difference between the estimated angle information and a reference angle; and detecting motion based on the determined difference. In some implementations, the number of operations also can include performing one or more operations based on at least one of the detected motion and the determined direction of motion. In addition, or in the alternative, the number of operations also can include sending, to the transmitting device, a command to perform one or more operations based on at least one of the detected motion and the determined direction of motion.

Another innovative aspect of the subject matter described in this disclosure can be implemented in a receiving device. The receiving device can include means for receiving, from a transmitting device, a packet containing a sequence; means for estimating angle information of the packet based on the sequence; means for determining a difference between the estimated angle information and a reference angle; and means for detecting motion based on the determined difference. In some implementations, the receiving device also can include means for performing one or more operations based on at least one of the detected motion and the determined direction of motion. In addition, or in the alternative, the receiving device also can include means for sending, to the transmitting device, a command to perform one or more operations based on at least one of the detected motion and the determined direction of motion.

BRIEF DESCRIPTION OF THE DRAWINGS

FIG. 4C shows example supplemental information configurations that may be used for estimating angle of arrival (AoA) information.

FIG. 4D shows example supplemental information configurations that may be used for estimating angle of departure (AoD) information.

Like reference numbers and designations in the various drawings indicate like elements.

DETAILED DESCRIPTION

Figure 1:
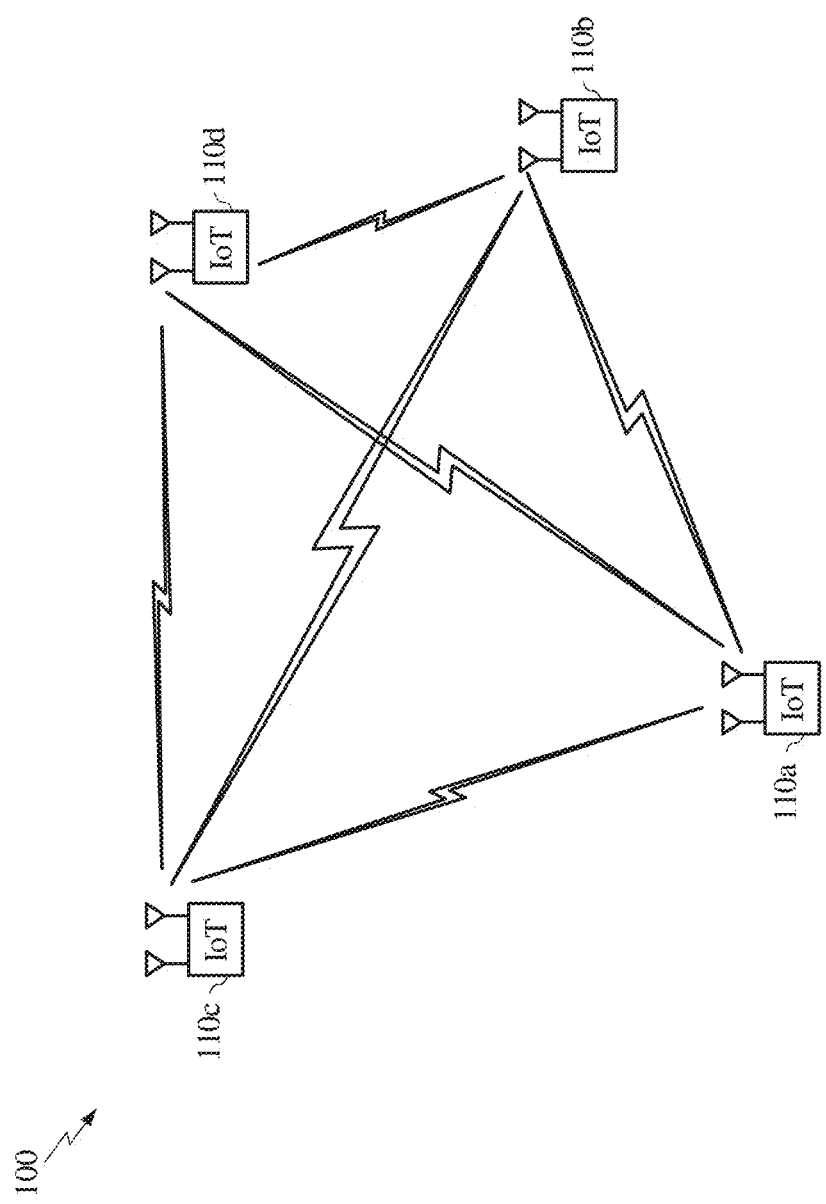
FIG. 1 shows an example wireless network.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 802.11 standards, the Bluetooth® specification, and cellular communication protocols such as (but not limited to) code division multiple access (CDMA), frequency division multiple access (FDMA), time division multiple access (TDMA), Global System for Mobile communications (GSM), GSM/General Packet Radio Service (GPRS), and Enhanced Data GSM Environment (EDGE), or other known signals that are used to communicate within a wireless, cellular or internet of things (TOT) network, such as a system utilizing 3G, 4G or 5G, or further implementations thereof, technology.

Given the increasing number of IoT devices deployed in home and business networks, it is desirable to detect motion within the vicinity served by such networks, for example, so that one or more IoT devices can be turned on or off when a person enters or leaves a particular area or room. More specifically, many home networks may include smart devices and appliances such as smart TVs and entertainment systems, smart garage doors, smart lighting systems, smart sound systems, smart security systems, and smart temperature control systems that may benefit from information indicating movement of persons within and around the home. However, because dedicated motion sensors can increase costs and complexity, it would be desirable to detect motion without using dedicated motion sensors.

Implementations of the subject matter described in this disclosure can be used to detect motion using wireless signals transmitted and received by components of a wireless network as opposed to using dedicated motion sensors. In some implementations, a receiving device may receive, from a transmitting device, a packet that contains or is associated with a sequence that is known to the receiving device. In some aspects, the packet may be a Bluetooth packet (such as a Bluetooth Low Energy (BLE) packet) including a supplemental information that contains the known sequence. In other aspects, the packet may be transmitted using another suitable wireless communications protocol (such as a Wi-Fi packet compatible with the IEEE 802.11 standards), and the sequence may be included within or appended to the packet in any suitable manner.

The receiving device may estimate angle information of the packet based on the sequence. As used herein, angle information may include angle of arrival (AoA) values, angle of departure (AoD) values, or a combination of AoA and AoD values. The receiving device may compare the estimated angle information with a reference angle. In some implementations, the receiving device is configured to determine a difference between an estimated angle and a reference angle, and detect motion based on the difference. In some aspects, the receiving device may detect a presence of motion based on the difference being greater than or equal to a value, and may detect an absence of motion based on the difference being less than the value. In some implementations, the receiving device also can determine a direction of motion based on the estimated angle information.

The reference angle may be stored in the receiving device, and may be based on estimated angle information for any number of packets previously received from the transmitting device (or another suitable device having a same physical location as the transmitting device). In some implementations, the receiving device may use one or more packets received from the transmitting device during a calibration operation to determine the reference angle. In some aspects, the calibration operation may be performed at times when there is no motion in the vicinity of the receiving device (such as at night or when a user of the receiving device is not present). In other implementations, the receiving device may use angle information estimated during one or more previous motion detection operations to determine the reference angle.

Particular implementations of the subject matter described in this disclosure can be implemented to realize one or more of the following potential advantages. By detecting motion based on wireless signals, the receiving device may detect a presence or absence of motion without including or using a dedicated motion sensor (which would undesirably increase the cost and complexity of the receiving device). Further, because the receiving device may use a variety of wireless signals received from the transmitting device to detect motion, the receiving device may detect the presence or absence of motion in its vicinity without relying on (or waiting for) ranging operations or positioning operations. For example, in some implementations, the receiving device may use packets received from the transmitting device during normal operations (such as paging operations, data transfers, command exchanges, and other non-positioning operations) to estimate angle information of the packets and to determine a relative position of the transmitting device with respect to the receiving device.

In some implementations, the receiving device may perform one or more operations based on at least one of the detected motion and the determined direction of motion. In some aspects, a software program executing instructions in the receiving device may send commands to one or more firmware or hardware components in the receiving device to trigger one or more operations in response to at least one of the detected motion and the determined direction of motion. In addition, or in the alternative, the receiving device may send, to the transmitting device, commands to perform one or more operations that may be based on the detection of motion. In addition, or as an alternative, the receiving device may determine a direction of motion based on the wireless signals, and may send commands, to the transmitting device, to perform one or more operations that may be based on the determined direction of motion.

FIG. 1 shows a block diagram of an example wireless system 100. The wireless system 100 is shown to include a plurality of Internet of Things (IoT) devices 110a-110d. In some implementations, the IoT devices 110a-110d may form a personal area network (PAN) and communicate with each other according to one or more Bluetooth protocols including, for example, Basic Rate Bluetooth, Enhanced Bluetooth, and Bluetooth Low Energy (BLE). In some aspects, the IoT devices 110a-110d may form a mesh network. In other implementations, the IoT devices 110a-110d also may be capable of communicating with each other using Wi-Fi communications (such as defined by the IEEE 802.11 family of standards). Thus, in at least some implementations, the IoT devices 110a-110d may communicate with each other using multiple wireless communication protocols (such as Wi-Fi signals and Bluetooth signals). In other implementations, the IoT devices 110a-110d may communicate with each other using only (or at least primarily) Bluetooth communication protocols.

Each of the IoT devices 110a-110d may be any suitable device capable of operating according to one or more communication protocols associated with IoT systems. For example, each of the IoT devices 110a-110d can be a smart television (TV), a remote control for the smart TV, a smart appliance, a smart meter, a smart thermostat or other temperature control system, a smart sensor, a gaming console, a set-top box, a smart light switch, a component of a smart sound system (such as a speaker), a smart garage opener, and the like. In some implementations, each of IoT devices 110a-110d may include a transceiver, one or more processing resources (such as processors or ASICs), one or more memory resources, and a power source (such as a battery). The memory resources may include a non-transitory computer-readable medium (such as one or more nonvolatile memory elements, such as EPROM, EEPROM, Flash memory, a hard drive, etc.) that stores instructions for performing operations described below with respect to FIGS. 7A-7D.

Figure 2:
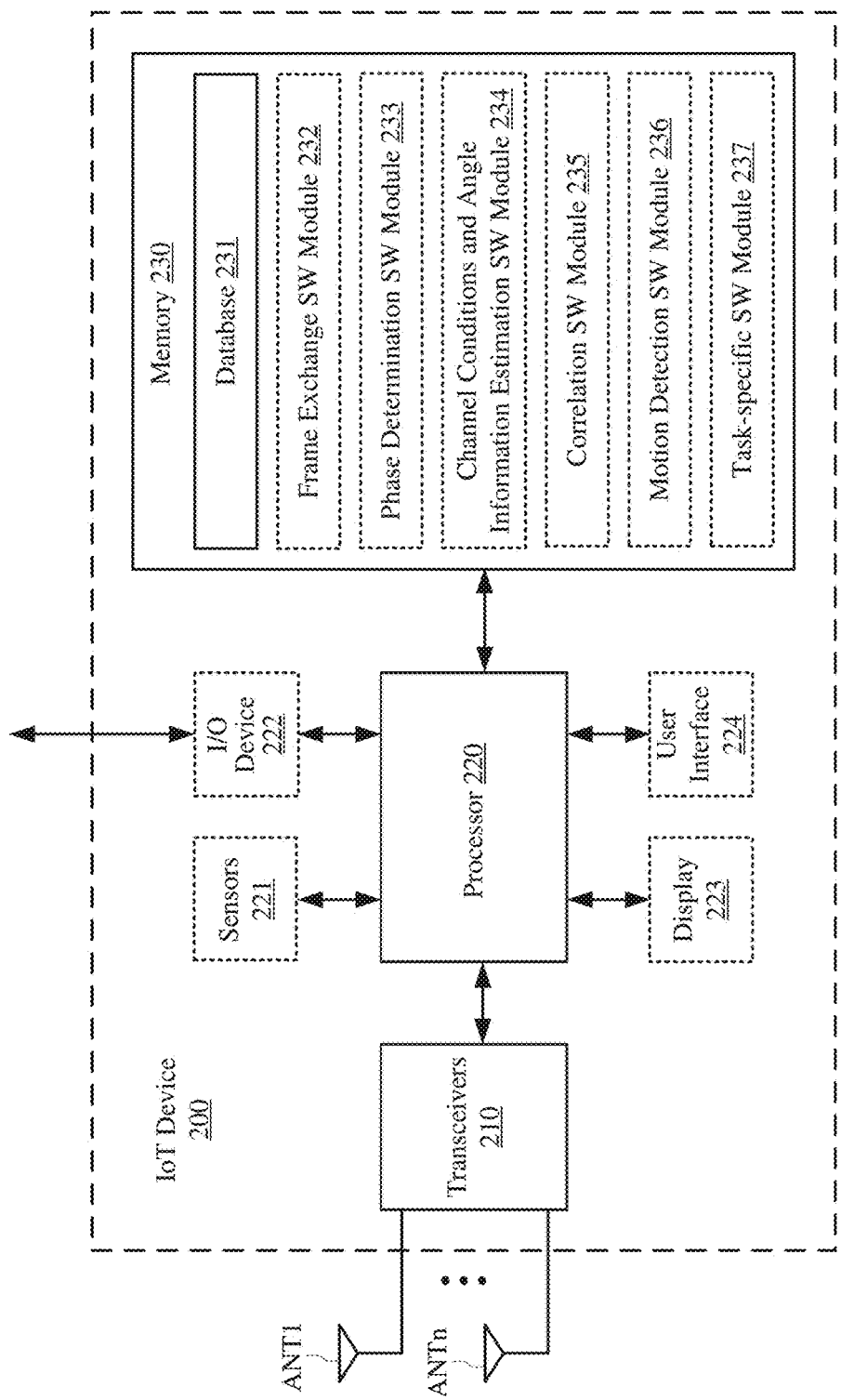
FIG. 2 shows a block diagram of an example wireless device.

FIG. 2 shows an example IoT device 200. The IoT device 200 may be one implementation of the IoT devices 110a-110d of FIG. 1. The IoT device 200 includes one or more transceivers 210, a processor 220, a memory 230, and a number of antennas ANT1-ANTn. The transceivers 210 may be coupled to the antennas ANT1-ANTn, either directly or through an antenna selection circuit (not shown for simplicity). The transceivers 210 may be used to transmit signals to and receive signals from APs, STAs, other IoT devices, or any other suitable wireless device. Although not shown in FIG. 2 for simplicity, the transceivers 210 may include any number of transmit chains to process and transmit signals to other wireless devices via antennas ANT1-ANTn, and may include any number of receive chains to process signals received from antennas ANT1-ANTn. For purposes of discussion herein, the processor 220 is shown as coupled between the transceivers 210 and the memory 230. For actual implementations, the transceivers 210, the processor 220, and the memory 230 may be connected together using one or more buses (not shown for simplicity).

The IoT device 200 may optionally include one or more of sensors 221, an input/output (I/O) device 222, a display 223, a user interface 224, and any other suitable component. For one example in which IoT device 200 is a smart television, the display 223 may be a TV screen, the I/O device 222 may provide audio-visual inputs and outputs, the user interface 224 may be a control panel, a remote control, and so on. For another example in which the IoT device 200 is a smart appliance, the display 223 may provide status information, and the user interface 224 may be a control panel to control operation of the smart appliance.

The memory 230 may include a database 231 that stores profile information for a plurality of wireless devices such as APs, stations, and other IoT devices. The profile information for a particular AP may include, for example, the AP's SSID, MAC address, channel information, RSSI values, goodput values, channel state information (CSI), supported data rates, connection history with the AP, a trustworthiness value of the AP (e.g., indicating a level of confidence about the AP's location, etc.), and any other suitable information pertaining to or describing the operation of the AP. The profile information for a particular IoT device or station may include, for example, the device's MAC address, IP address, supported data rates, preferred frequency bands or channels, frequency hopping schedules, a number of capabilities, and any other suitable information pertaining to or describing the operation of the device.

The memory 230 also may include a non-transitory computer-readable storage medium (such as one or more non-volatile memory elements, such as EPROM, EEPROM, Flash memory, a hard drive, and so on) that may store the following software (SW) modules:

a frame exchange software module 232 to create and exchange messages and packets (such as advertising messages, device discovery messages, service discovery messages, and data packets) between the IoT device 200 and other wireless devices, for example, as described below with respect to FIGS. 7A-7D;

a phase determination software module 233 to determine phase information of packets received from other wireless devices, for example, as described below with respect to FIGS. 7A-7D;

a channel conditions and angle information estimation software module 234 to estimate channel conditions and angle information based on one or more packets received from other wireless devices, for example, as described below with respect to FIGS. 7A-7D;

a correlation software module 235 to determine changes or differences in channel conditions, angle information, channel correlation, first arrival path (FAP) power levels, and multi-path amounts over a period of time (such as between a first time and a second time), for example, as described below with respect to FIGS. 7A-7D;

a motion detection software module 236 to detect or determine a presence of motion based at least in part on the changes or differences determined by the correlation software module 235, for example, as described below with respect to FIGS. 7A-7D; and a task-specific software module 237 to facilitate the performance of one or more tasks that may be specific to the IoT device 200.

Each software module includes instructions that, when executed by the processor 220, may cause the IoT device 200 to perform the corresponding functions. The non-transitory computer-readable medium of the memory 230 thus includes instructions for performing all or a portion of the operations described below.

The processor 220 may be any one or more suitable processors capable of executing scripts or instructions of one or more software programs stored in the IoT device 200 (such as within the memory 230). For example, the processor 220 may execute the frame exchange software module 232 to create and exchange messages and packets (such as advertising messages, device discovery messages, service discovery messages, and data packets) between the IoT device 200 and other wireless devices. The processor 220 may execute the phase determination software module 233 to determine phase information of packets received from other wireless devices.

The processor 220 may execute the channel conditions and angle information estimation software module 234 to estimate channel conditions based on one or more packets received from other wireless devices, to estimate angle information of one or more packets received from other wireless devices, or both. In some implementations, the channel conditions and angle information estimation software module 234 may be executed to determine angle information of Bluetooth packets based on sequences contained in supplemental information appended to the Bluetooth packets. In some aspects, the Bluetooth packets may be BLE packets or messages.

The processor 220 may execute the correlation software module 235 to determine changes or differences in channel conditions, angle information, channel correlation, FAP power levels, and multi-path amounts over a period of time (such as between a first time and a second time). In some implementations, the correlation software module 235 may be executed to determine a difference between one or more estimated angles associated with a received packet and a reference angle. In some aspects, the reference angle may be stored in the memory 230 (such as in the database 231). Additionally or alternatively, in some implementations, the correlation software module 235 may be executed to determine differences between channel conditions estimated at a plurality of different times.

The processor 220 may execute the motion detection software module 236 to detect or determine a presence of motion based on the changes or differences determined by the correlation software module 235. In some implementations, the motion detection software module 236 may be executed to detect motion based on the difference between an estimated angle of a received packet and a reference angle. In some aspects, execution of the motion detection software module 236 may detect a presence of motion based on the difference between the estimated angle and the reference angle being greater than or equal to a value, and may detect an absence of motion based on the difference between the estimated angle information and the reference angle being less than the value.

In some implementations, the value may be selected to achieve a desired balance between reducing false indications of motion and ensuring that a presence of motion in the vicinity of the IoT device 200 (or in the vicinity of the transmitting device) is detected. For example, if the selected value is too low, then the IoT device 200 may detect a presence of motion based on differences in estimated angle information and the reference angle that lie within a tolerance or margin of error, which in turn may cause the IoT device 200 to provide false indications of motion. Conversely, if the selected value is too high, then the IoT device 200 may detect an absence of motion based on differences in estimated angle information and the reference angle that are consistent with a presence of motion in the vicinity of the IoT device 200.

The processor 220 may execute the task-specific software module 237 to facilitate the performance of one or more tasks that may be specific to the IoT device 200. For one example in which the IoT device 200 is a smart TV, execution of the task specific software module 237 may cause the smart TV to turn on and off, to select an input source, to select an output device, to stream video, to select a channel, and so on (or to control one or more operations of an associated remote control). For another example in which the IoT device 200 is a remote control for the smart TV, execution of the task specific software module 237 may cause the remote control to control one or more operations of the smart TV, to control one or more operations of the remote control, or both.

In some implementations in which the IoT device 200 is a smart TV, execution of the task specific software module 237 may cause the smart TV to initiate motion detection operations with another wireless device such as, for example, a remote control paired with the smart TV. Similarly, when the IoT device 200 is the paired remote control, execution of the task specific software module 237 may cause the remote control to participate in motion detection operations with the smart TV. In some aspects, execution of the task specific software module 237 also may be used to exchange capabilities with another wireless device and to negotiate a number of parameters for motion detection operations. The capabilities may include, for example, the number of antennas to use when transmitting or receiving packets and supplemental information, a capability to decode sequences contained in the supplemental information appended to a Bluetooth packet, a capability to estimate AoA information, a capability to estimate AoD information, a capability to provide feedback to the other device, or any combination thereof. The number of negotiated parameters may include, for example, a channel to be used for transmitting packets and supplemental information, a frequency-hopping schedule to be used for transmitting packets and supplemental information, and one or more characteristics of the supplemental information to be appended to packets. In some aspects, the exchanged capabilities and the negotiated parameters may be used for the transmission of packets containing sequences during non-motion detection operations, for example, so that the IoT device 200 may estimate angle information of packets received during a variety of message exchanges with a transmitting device.

In one example implementation in which the IoT device 200 is a remote control and the transmitting device is a smart TV, the IoT device 200 may detect motion in the vicinity of the smart TV (or itself) based on packets and supplemental information received from the smart TV, and then control one or more operations of the smart TV based on the detected motion. In some aspects, when the IoT device 200 detects a presence of motion near itself or the smart TV, the IoT device 200 may transmit a message that either turns on or turns off the smart TV based on a determined direction of the detected motion. For one example, if the IoT device 200 determines that a person is walking towards the smart TV, the IoT device 200 may cause the smart TV to turn on. For another example, if the IoT device 200 determines that a person is walking away from the smart TV, the IoT device 200 may cause the smart TV to turn off. Conversely, when the IoT device 200 detects an absence of motion near itself or the smart TV, the IoT device 200 may transmit a message that turns off the smart TV. In some aspects, the IoT device 200 may determine an absence of motion near itself or the smart TV for at least a suitable time duration before causing the smart TV to turn off.

In another example implementation in which the IoT device 200 is a smart TV and the transmitting device is a remote control, the IoT device 200 may detect motion in the vicinity of the remote control (or itself) based on packets and supplemental information received from the remote control, and then control one or more operations of itself based on the detected motion. In some aspects, when the IoT device 200 detects a presence of motion near itself or the remote control, the IoT device 200 may either turn itself on or turn itself off based on a direction of the detected motion. For one example, if the IoT device 200 determines that a person is walking towards itself, the IoT device 200 may turn itself on. For another example, if the IoT device 200 determines that a person is walking away from itself, the IoT device 200 may turn itself off. Conversely, when the IoT device 200 detects an absence of motion near itself, the IoT device 200 may turn itself off. In some aspects, the IoT device 200 may determine an absence of motion near itself or the remote control for at least a suitable time duration before turning itself off.

For purposes of discussion herein, it is assumed that a pair of wireless devices (such as a smart TV and an associated remote control) are already paired and have established a Bluetooth session. Thus, device discovery operations, service discovery operations, Bluetooth profiles, and other well-known aspects of negotiating, setting up, and maintaining Bluetooth sessions between wireless devices are not described herein. Further, although described herein with respect to a smart TV and a remote control, aspects of the present disclosure are equally applicable to any suitable device (such as IoT devices, Wi-Fi enabled devices, and so on) that are capable of transmitting or receiving Bluetooth packets.

Figure 3A:
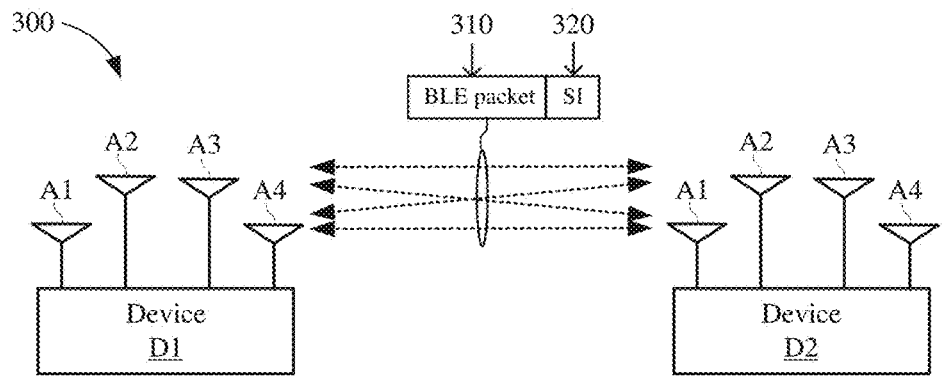
FIG. 3A shows an example exchange of Bluetooth packets between a first device and a second device.

FIG. 3A shows an example exchange 300 of a number of Bluetooth packets 310 between a first device D1 and a second device D2. In some implementations, as described above, the Bluetooth packets may be BLE packets. Although only one Bluetooth packet 310 is shown in FIG. 3A for simplicity, it is to be understood that the first device D1 and the second device D2 may exchange any number of Bluetooth packets 310. The first device D1 and the second device D2 are each capable of decoding supplemental information included within or appended to the Bluetooth packet 310, for example, to determine angle information associated with the Bluetooth packet 310. As described above, in some implementations, the first and second devices D1 and D2 are paired with each other (such as having established a Bluetooth session with each other), and each of the first and second devices D1 and D2 may be in the connection state. In some aspects, the first device D1 may be a smart TV, and the second device D2 may be a remote control. In other aspects, the first device D1 may be the remote control, and the second device D2 may be the smart TV. In some other aspects, the first device D1 and the second device D2 each may be any suitable wireless device.

For the example of FIG. 3A, the first device D1 and the second device D2 are each depicted as including 4 antennas A1-A4. In some aspects, one or more of the antennas A1-A4 may be internal antennas (such as integrated within a wireless connectivity chip contained in the first device D1 or the second device D2). In addition, or in the alternative, one or more of the antennas may be external to one or both of the first device D1 and the second device D2. In other implementations, the first device D1 and the second device D2 may include or be coupled to other suitable numbers of antennas. For one example, the first device D1 may include 8 internal antennas and 8 external antennas, and the second device D2 may include 8 internal antennas and 8 external antennas.

In some implementations, the Bluetooth packet 310 includes supplemental information (SI) 320 appended to the packet. In some such implementations, the supplemental information 320 contains a known sequence (such as all logic "1's"). The supplemental information 320 can be used to estimate angle information of the Bluetooth packet 310. For example, the receiving device can estimate AoA information of the Bluetooth packet 310 based on phase differences between signal components of the sequence contained in the supplemental information 320 arriving at multiple antennas of the receiving device. As another example, AoD information of the Bluetooth packet 310 can be estimated based on phase differences between signal components of the sequence contained in the supplemental information 320 transmitted from multiple antennas of the transmitting device. Specifically, the first device D1 may use its multiple antennas A1-A4 to receive the Bluetooth packet 310 and its supplemental information 320 from the second device D2, and may use phase differences between signal components of the sequence arriving at its antennas A1-A4 to estimate AoA information of the Bluetooth packet 310. As another example, the first device D1 may use its multiple antennas A1-A4 to transmit the Bluetooth packet 310 and its supplemental information 320 to the second device D2, and the second device D2 may use phase differences between signal components of the sequence transmitted from the multiple antennas A1-A4 of the first device D1 (as measured at a receive antenna of the second device D2) to estimate AoD information of the Bluetooth packet 310.

Figure 3B:
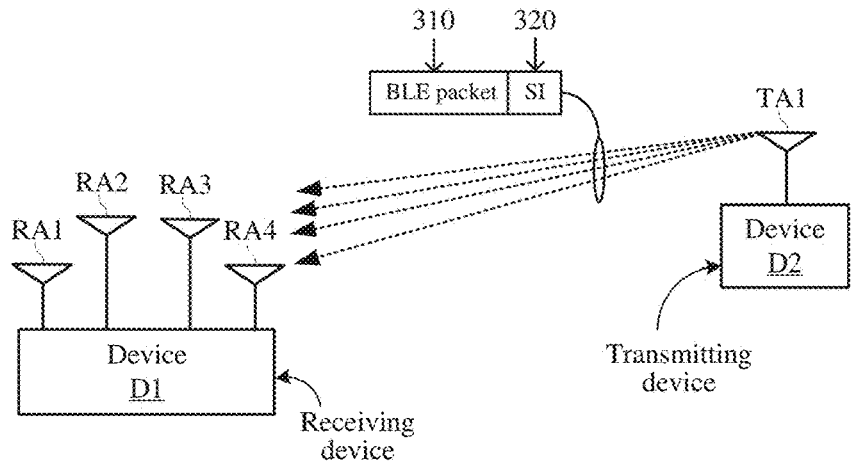
FIG. 3B shows the first device of FIG. 3A receiving a Bluetooth packet from the second device.
Figure 3C:
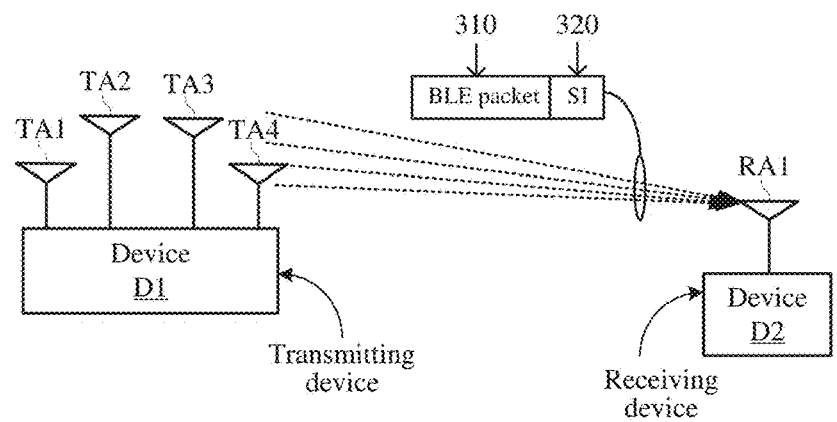
FIG. 3C shows the first device of FIG. 3A transmitting a Bluetooth packet to the second device.
Figure 4A:
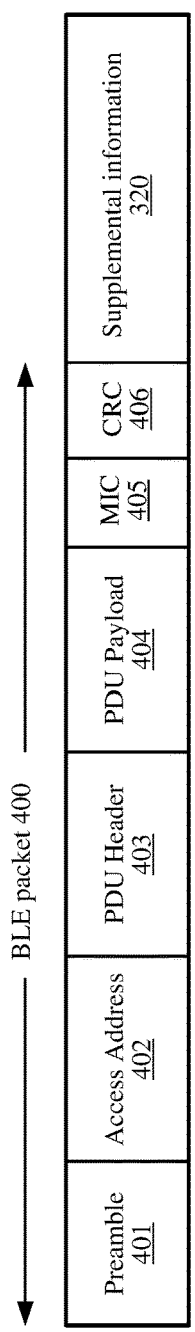
FIG. 4A shows an example Bluetooth Low Energy (BLE) packet.

FIG. 4A shows an example BLE packet 400. The BLE packet 400, which may be one implementation of the Bluetooth packet 310 of FIGS. 3A-3C, includes a preamble 401, an access address 402, a protocol data unit (PDU) header 403, a PDU payload 404, a Message Integrity Check (MIC) 405, and a cyclic redundancy check (CRC) 406. In some implementations, the entire BLE packet 400 is transmitted at the same symbol rate, for example, using either 1 Ms/s or 2 Ms/s modulation. The preamble 401 may contain timing and synchronization information. The access address 402 may contain addresses such as a source address and a destination address. The PDU header 403 may contain one or more identifiers. In some implementations, for data channel PDUs, the PDU header 403 contains the Logical Link Identifier (LLID), the Next Expected Sequence Number (NESN), Sequence Number (SN), More Data (MD), the payload length and an indication of whether there is supplemental information 320 present. In some other implementations, for data channel PDUs that contain control commands, the data channel PDU payload contains a command opcode and control data that is specific to the command. The MIC 405 value may be used to authenticate the data PDU. The CRC 406 may be used for error correction. The supplemental information 320, which is an optional field that may be appended to the BLE packet 400, may have a duration of between 16 μs and 160 μs. In some aspects, the sequence contained in the supplemental information 320 may be a constantly modulated series of unwhitened logic 1's (such that the sequence is not white noise).

FIG. 3B shows the first device D1 of FIG. 3A receiving the Bluetooth packet 310 transmitted from the second device D2. In the illustrated implementation, the first device D1 operates as the receiving device and the second device D2 operates as the transmitting device. In some implementations, the second device D2 (operating as the transmitting device) uses one transmit antenna (TA1) to transmit the Bluetooth packet 310, and the first device D1 (operating as the receiving device) uses four receive antennas (RA1-RA4) to receive the Bluetooth packet 310, as depicted in FIG. 3B. In some other implementations, the second device D2 may use multiple antennas to transmit the Bluetooth packet 310, and the first device D1 may use other numbers of antennas to receive the Bluetooth packet 310.

The first device D1 may determine phase differences between signal components of the Bluetooth packet's sequence arriving at its receive antennas RA1-RA4 and use the determined phase differences to estimate AoA information of the Bluetooth packet 310. For example, because the first device D1 uses multiple (for example, four) receive antennas RA1-RA4 to receive the supplemental information 320 transmitted from a single antenna (TA) of the second device D2, the first device D1 can determine phase differences between signal components of the sequence contained in the supplemental information 320 arriving at its four receive antennas RA1-RA4. Further, because the distance (d) between each of the four receive antennas RA1-RA4 is known to the first device D1, the first device D1 can estimate AoA information of the Bluetooth packet 310 based on known distances between its receive antennas RA1-RA4 and the determined phase differences.

FIG. 3C shows the first device D1 of FIG. 3A transmitting the Bluetooth packet 310 to the second device D2. In the illustrated implementation, the first device D1 operates as the transmitting device, and the second device D2 operates as the receiving device. In some implementations, the first device D1 (operating as the transmitting device) uses four transmit antennas (TA1-TA4) to transmit the Bluetooth packet 310 and the second device D2 (operating as the receiving device) uses one receive antenna (RA1) to receive the Bluetooth packet 310, as depicted in FIG. 3C. In some other implementations, the first device D1 may use other numbers of antennas to transmit the Bluetooth packet 310, and the second device D2 may use multiple antennas to receive the Bluetooth packet 310.

The second device D2 may determine phase differences between signal components of the Bluetooth packet's sequence transmitted from the four transmit antennas TA1-TA4 of the first device D1 and use the determined phase differences to estimate AoD information of the Bluetooth packet 310. For example, because the first device D1 transmits the supplemental information 320 of the Bluetooth packet 310 using multiple (for example, four) transmit antennas, and each of the transmit antennas is separated by a known distance (d), the second device D2 can determine phase differences between signal components of the sequence transmitted from the four transmit antennas TA1-TA4 of the first device D1 (as measured at the receive antenna RA1 of the second device D2), and use the known distances between the transmit antennas TA1-TA4 and the determined phase differences to estimate AoD information of the Bluetooth packet 310.

Various aspects of the present disclosure may leverage the supplemental information 320 for motion detection. In some implementations, Bluetooth devices such as the first device D1 and the second device D2 of FIGS. 3A-3C may use changes in angle information of Bluetooth packets to detect the presence of motion. In some implementations, if the estimated AoA values or estimated AoD values change by more than a value over a suitable duration of time (such as between a first time and a second subsequent time), then one or both of the first device D1 and the second device D2 may determine that there is motion in the vicinity of the first and the second devices D1 and D2, respectively. For example, if a person walks between the first device D1 and the second device D2, the estimated AoA or AoD information may change by more than the value. Conversely, if the estimated AoA values or estimated AoD values change by less than the value over the duration of time (or if there is no change in the estimated AoA values or estimated AoD values), then one or both of the first device D1 and the second device D2 may determine that there is an absence of motion in the vicinity of the first and the second devices D1 and D2, respectively.

In some implementations, the first time marking the start of the duration may be selected to occur when there is no motion in the vicinity of the first device D1 and the second device D2 (such as at night or when no one is present). In this manner, angle information estimated by the first device D1, the second device D2, or both the first and second devices D1 and D2 at the first time may be used to form or generate reference angle information with which angle information estimated at subsequent times (such as at the second time) can be compared to determine whether there is a presence (or absence) of motion at the subsequent times. In some aspects, the reference angle information may be based on estimated angle information of a single packet (such as the Bluetooth packet 310). In some other implementations, the reference angle information may be based on estimated angle information of a plurality of packets (such as an average or median value of a corresponding plurality of estimated AoA values or AoD values).

In addition to, or as an alternative to, detecting motion based on changes in AoA or AoD values, in some implementations, Bluetooth devices such as the first device D1 and the second device D2 of FIGS. 3A-3C may use changes in channel conditions to detect motion. For one example, referring again to FIG. 3B, when the first device D1 receives the Bluetooth packet 310 and the supplemental information 320 from the second device D2, the first device D1 may estimate channel conditions based on the sequence contained in the supplemental information 320. Because the tones contained in the supplemental information 320 arrive at the receive antennas RA1-RA4 at different times (and thus have different phases), the first device D1 can estimate channel conditions based on the tones contained in the supplemental information 320.

If the estimated channel conditions change by more than a selected value over a suitable duration of time (such as between a first time and a second time), then one or both of the first device D1 and the second device D2 may determine that there is motion in the vicinity of the first and the second devices D1 and D2, respectively. For example, if a person walks between the first device D1 and the second device D2, the channel conditions estimated by the first device D1 may change by more than the selected value. Conversely, if the estimated channel conditions change by less than the selected value over the duration of time (or if there is no change in the estimated channel conditions), then one or both of the first device D1 and the second device D2 may determine that there is an absence of motion in the vicinity of the first and the second devices D1 and D2, respectively.

In some implementations, the first time marking the start of the duration may be selected to occur when there is no motion in the vicinity of the first device D1 and the second device D2 (such as at night or when no one is present). In this manner, channel conditions estimated at the first time may be used to form or generate a baseline or reference channel estimate with which channel conditions estimated at subsequent times (such as at the second time) can be compared to determine whether there is a presence (or absence) of motion at the subsequent times. The first device D1 may generate the reference channel estimates by receiving the Bluetooth packet 310 at the first time, and then estimate the phase of the tone contained in the supplemental information 320 at each sample time (such as every 1 µs or every 2 µs). The phase samples may be stored as a reference array of phase values. In some implementations, the first device D1 may analyze the phase samples captured during reception of the supplemental information 320 to determine an amount of phase variance that may normally occur within the duration of the supplemental information 320 (such as 160 µs). The amount of "normal" phase variance may be used to determine the selected value, for example, to reduce the likelihood of false indications of motion.

Once the reference array of phase values is generated, the first device D1 may periodically (or in response to a trigger transmitted by another device) sample the phase values of tones contained in a number of subsequently received supplemental information appended to Bluetooth packets to generate a corresponding number of additional arrays of phase values. Each of the additional arrays of phase values may be compared with the reference array of phase values to determine a presence or absence of motion at a corresponding number of times. In some aspects, each additional array of phase values may be compared with the reference array of phase values, on a point-by-point basis (on a per-sample basis), using a minimum mean squared error (MMSE) detector to generate a difference value. If the generated difference value is greater than the selected value, then an indication of motion may be provided. Thus, in at least some aspects, the supplemental information 320 of a reference Bluetooth packet may be processed by a MMSE detector to generate a reference value, and the supplemental information 320 of each subsequent Bluetooth packet 310 may be processed by the MMSE detector to generate a corresponding channel estimate value.

In some implementations, the transmitting device may switch antennas during transmission of the sequence contained in the supplemental information appended to a Bluetooth packet. More specifically, referring again to FIG. 3C, when the first device D1 transmits the Bluetooth packet 310 and the supplemental information 320 to the second device D2, the first device D1 may switch its transmit antennas TA1-TA4 during transmission of the supplemental information 320, for example, so that sequential portions (such as successive tones) of the sequence contained in the supplemental information 320 are transmitted from different transmit antennas TA1-TA4 of the first device D1. By transmitting sequential tones of the supplemental information 320 using different transmit antennas of the first device D1, the second device D2 (as the receiving device) can estimate channel conditions based on the received tones in the supplemental information 320.

For example, the first device D1 may transmit the tones contained in the supplemental information 320 at a rate of 1 bit/µs, and may switch its transmit antennas TA1-TA4 at an interval that is an integer multiple of the transmission rate. For one example, the first device D1 may switch its transmit antennas TA1-TA4 every 1 µs. For another example, the first device D1 may switch its transmit antennas TA1-TA4 every 2 µs (or at other suitable switching times or intervals). In some implementations, the first device D1 may transmit an antenna switching schedule to the second device D2. In some aspects, the antenna switching schedule may indicate the switching interval of the transmit antennas TA1-TA4 and may indicate which of the transmit antennas TA1-TA4 is to transmit the first tone in the sequence contained in the supplemental information 320. In other aspects, the antenna switching schedule may include a mapping indicating from which of the transmit antennas TA1-TA4 each of the tones in the sequence contained in the supplemental information 320 is to be transmitted.

Because the second device D2 (as the receiving device) knows the tone sequence and knows the antenna switching sequence or schedule of the first device D1 (as the transmitting device), the second device D2 can use the tones transmitted from the different antennas TA1-TA4 of the first device D1 to estimate channel conditions. In some aspects, the second device D2 (as the receiving device) can determine the phase angle of the received tone, and then identify which of the transmit antennas TA1-TA4 of the first device D1 transmitted a particular tone (or portion of the tone) based on the determined phase angle.

Figure 4B:
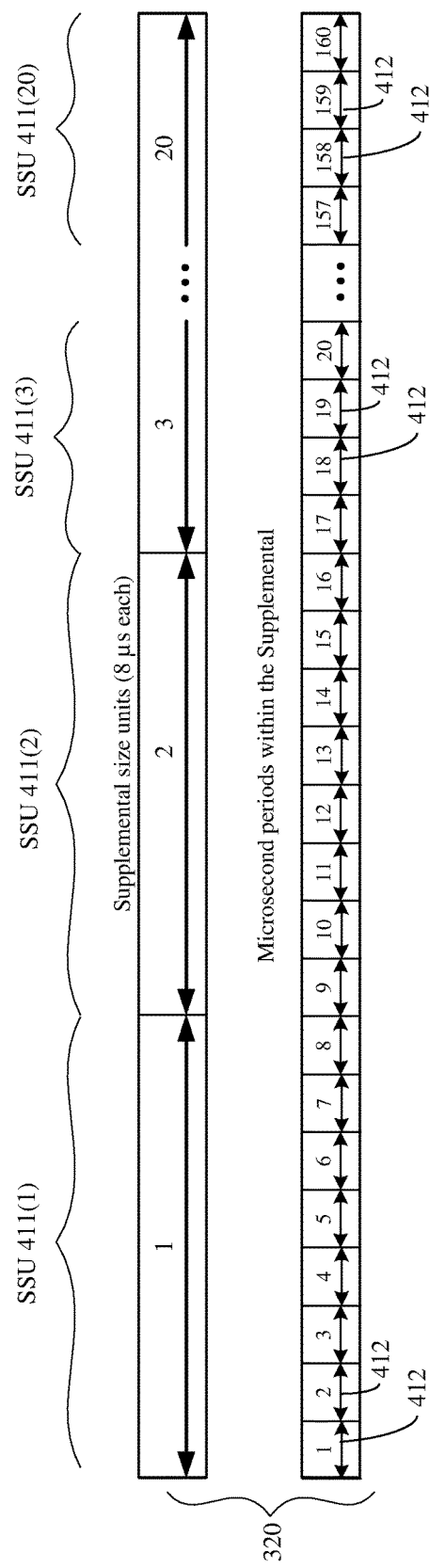
FIG. 4B shows the supplemental size units (SSUs) of the supplemental information of the BLE packet of FIG. 4A.

FIG. 4B shows the supplemental size units (SSUs) of the supplemental information 320 of a Bluetooth packet of FIG. 4A. The supplemental information 320 is shown to include 20 SSUs 411(1)-411(20), each having a duration of 8 μs and divided into eight 1 μs periods 412.

FIG. 4C shows example supplemental information configurations 421-423 that may be used for estimating angle of arrival (AoA) information. Each of the supplemental information configurations 421-423 may be one implementation of the supplemental information 320 of FIGS. 3A-3C and FIGS. 4A-4B. The first supplemental information configuration 421 denotes a continuous transmission, and may be used for estimating AoA values.

The second supplemental information configuration 422 includes a 4 μs guard period, an 8 μs reference period, and a sequence of alternating switch slots and sample slots. In some aspects, the second supplemental information configuration 422 may include a plurality of interleaved 1 μs switch slots and 1 μs sample slots. When a transmitting device transmits a Bluetooth packet including the second supplemental information configuration 422, a receiving device may switch signal reception operations between its receive antennas every 1 μs, for example, so that each of its receive antennas samples a corresponding tone in the supplemental information for 1 μs. In some aspects, the first device D1 of FIG. 3B may use the first receive antenna RA1 to sample a first tone in the supplemental information 320 for 1 μs, switch antennas and use the second receive antenna RA2 to sample a second tone in the supplemental information 320 for 1 μs, switch antennas and use the third receive antenna RA3 to sample a third tone in the supplemental information 320 for 1 μs, switch antennas and use the fourth receive antenna RA4 to sample a fourth tone in the supplemental information 320 for 1 μs, switch antennas and use the first receive antenna RA1 to sample a fifth tone in the supplemental information 320 for 1 μs, and so on, such that the receive antennas RA1-RA4 of the first device D1 are alternately used (each for 1 μs) to receive sequential tones of the supplemental information 320.

The third supplemental information configuration 423 includes a 4 μs guard period, an 8 μs reference period, and a sequence of alternating switch slots and sample slots. In some aspects, the third supplemental information configuration 423 may include a plurality of interleaved 2 μs switch slots and 2 μs sample slots. When a transmitting device transmits a Bluetooth packet including the second supplemental information configuration 422, a receiving device may switch signal reception operations between its receive antennas every 2 μs, for example, so that each of its receive antennas samples a corresponding tone in the supplemental information for 2 μs. In some aspects, the first device D1 of FIG. 3B may use the first receive antenna RA1 to sample a first tone in the supplemental information 320 for 2 μs, switch antennas and use the second receive antenna RA2 to sample a second tone in the supplemental information 320 for 2 μs, switch antennas and use the third receive antenna RA3 to sample a third tone in the supplemental information 320 for 2 μs, switch antennas and use the fourth receive antenna RA4 to sample a fourth tone in the supplemental information 320 for 2 μs, switch antennas and use the first receive antenna RA1 to sample a fifth tone in the supplemental information 320 for 2 μs, and so on, such that the receive antennas RA1-RA4 of the first device D1 are alternately used (each for 2 μs) to receive sequential tones of the supplemental information 320.

FIG. 4D shows example supplemental information configurations 431-434 that may be used for estimating angle of departure (AoD) information. Each of the supplemental information configurations 431-434 may be one implementation of the supplemental information 320 of FIGS. 3A-3C and FIGS. 4A-4B. Each of the supplemental information configurations 431-434 is shown to include a 4 μs guard period, an 8 μs reference period, and a sequence of alternating switch slots and sample/transmit slots. The first supplemental information configuration 431 may include a plurality of interleaved 1 μs switch slots and 1 μs transmit slots, and may be used for AoD transmissions. The second supplemental information configuration 432 may include a plurality of interleaved 1 μs switch slots and 1 μs sample slots, and may be used for AoD receptions. The third supplemental information configuration 433 may include a plurality of interleaved 2 μs switch slots and 2 μs transmit slots, and may be used for AoD transmissions. The fourth supplemental information configuration 434 may include a plurality of interleaved 2 μs switch slots and 2 μs sample slots, and may be used for AoD receptions.

In some implementations, changes in channel information can be determined based on an amount of multi-path changing by more than a threshold value over a duration between a first time and a second time. Additionally or alternatively, in some implementations, changes in channel information can be determined based on an amount of channel correlation changing by more than a threshold value over a duration between a first time and a second time. Additionally or alternatively, in some implementations, changes in channel information can be determined based on an amount of power in the FAP changing by more than a threshold value over a duration between a first time and a second time. These techniques are described below with respect to FIGS. 5A-5C and FIGS. 6A-6C.

Figure 5A:
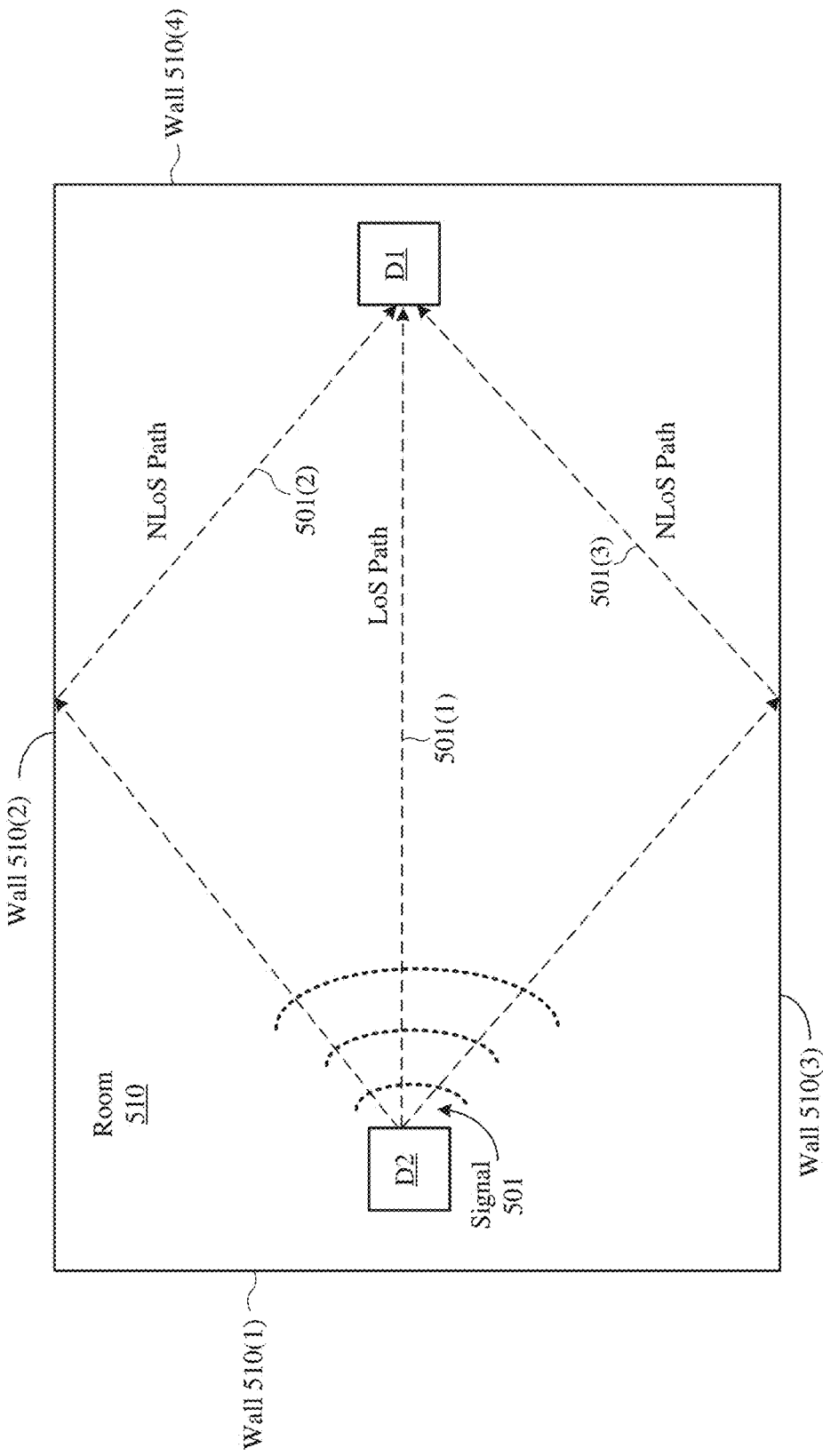
FIG. 5A shows an example transmission of a multipath wireless signal in a room without motion at a first time.

FIG. 5A shows an example transmission of a multipath wireless signal 501 in a room 510 without motion at a first time T1. As depicted in FIG. 5A, a first device D1 receives the wireless signal 501 transmitted from a second device D2. The wireless signal 501 may be any suitable wireless signal from which channel conditions can be estimated including, for example, a Bluetooth (for example, BLE) packet. The wireless signal 501 may be influenced by multipath effects resulting, for example, from at least walls 510(2) and 510(4) of room 510 (other obstacles, such as furniture, may also cause multipath signals), and is shown to include a first signal component 501(1), a second signal component 501(2), and a third signal component 501(3). The first signal component 501(1) travels directly from the second device D2 to the first device D1 along a line-of-signal (LOS) path, the second signal component 501(2) travels indirectly from the second device D2 to the first device D1 along a non-LOS (NLOS) path that reflects off wall 510(2), and the third signal component 501(3) travels indirectly from the second device D2 to the first device D1 along a NLOS path that reflects off wall 510(3). As a result, the first signal component 501(1) may arrive at the first device D1 at different times or at different angles compared to the second signal component 501(2) or the third signal component 501(3).

Although only two NLOS signal paths are depicted in FIG. 5A, the wireless signal 501 may have any number of signal components that travel along any number of NLOS paths between the second device D2 and the first device D1. Further, although the first signal component 501(1) is depicted as being received by the first device D1 without intervening reflections, for other examples, the first signal component 501(1) may be reflected one or more times before received by the first device D1.

It would be desirable for the first device D1 to detect motion in its vicinity (such as within the room 510) without using a separate or dedicated motion sensor. In some implementations, the first device D1 may use the wireless signal 501 transmitted from the second device D2 to detect motion within the room 510. More specifically, the first device D1 may estimate channel conditions based at least in part on the wireless signal 501, and then detect motion based at least in part on the estimated channel conditions. Thereafter, the first device D1 may perform a number of operations based on the detected motion. For example, the first device D1 may turn itself on when motion is detected, and turn itself off when motion is not detected for a time period.

As depicted in FIG. 5A, the wireless signal 501 includes multipath signals associated with multiple arrival paths. As a result, the detection of motion in room 510 may be based on at least one characteristic of the multipath signals. For purposes of discussion herein, there is no motion in room 510 at the time T1 depicted in FIG. 5A (such as a night when no one is in the room 510 or during times when no one is at home or walking through room 510). In some implementations, the first device D1 may estimate channel conditions when there is no motion in room 510, and then designate these estimated channel conditions as reference channel conditions. The reference channel conditions may be stored in the first device D1 or in any other suitable device coupled to the first device D1, for example, as occurring at the first time T1. The first device D1 may estimate or determine the reference channel conditions continuously, periodically, randomly, or at one or more specified times (such as when there is no motion in the room 510).

Figure 6A:
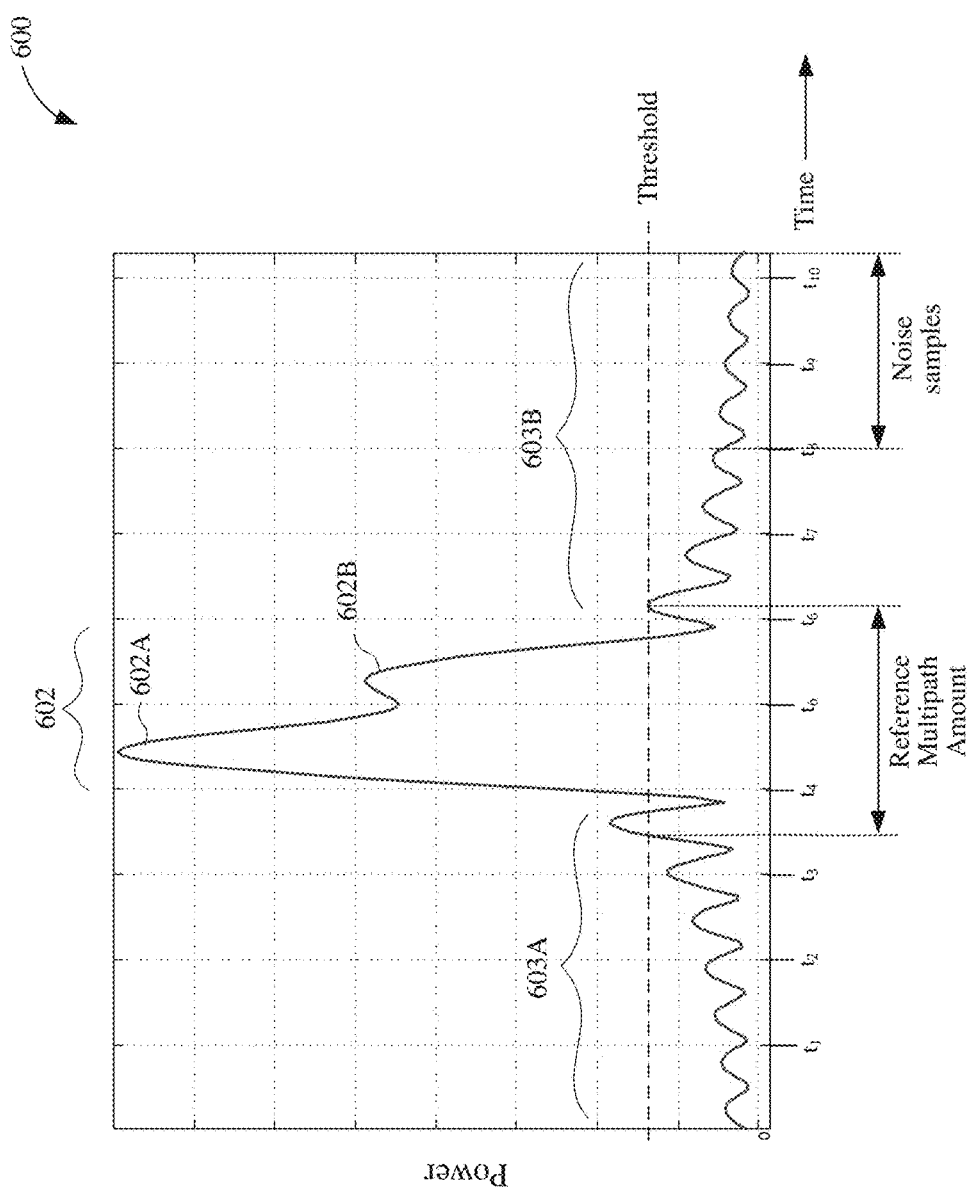
FIG. 6A shows an example channel impulse response of the multipath wireless signal of FIG. 5A.

FIG. 6A shows an example channel impulse response 600 of the wireless signal 501 of FIG. 5A. The channel impulse response 600 may be expressed in terms of power (y-axis) as a function of time (x-axis). As described above with respect to FIG. 5A, the wireless signal 501 includes line-of-sight (LOS) signal components and non-LOS (NLOS) signal components, and is received by the first device D1 in the presence of multipath effects. In some implementations, the first device D1 may determine the channel impulse response 600 by taking an Inverse Fourier Transfer (IFT) function of a channel frequency response of the wireless signal 501. Thus, in some aspects, the channel impulse response 600 may be a time-domain representation of the wireless signal 501 of FIG. 5A. Because the wireless signal 501 of FIG. 5A includes an LOS signal component 501(1) and a number of NLOS signal components 501(2)-501(3), the channel impulse response 600 of FIG. 6A may be a superposition of multiple sinc pulses, each associated with a corresponding peak or "tap" at a corresponding time value.

More specifically, the channel impulse response 600 is shown to include a main lobe 602 occurring between approximately times $t_4$ and $t_6$, and includes a plurality of secondary lobes 603A and 603B on either side of the main lobe 602. The main lobe 602 includes a first peak 602A and a second peak 602B of different magnitudes, for example, caused by multipath effects. The first peak 602A, which has a greater magnitude than the second peak 602B, may represent the signal components traveling along the first arrival path (FAP) to the first device D1 of FIG. 5A. In some aspects, the main peak 602A may be the first arrival in the channel impulse response 600, and may represent the LOS signal components as well as one or more NLOS signal components that may arrive at the first device D1 at the same time (or nearly the same time) as the LOS signal components. The taps associated with the secondary lobes 603A and 603B may be later arrivals in the channel impulse response 600, and may represent the NLOS signal components arriving at the first device D1.

As shown in FIG. 6A, a threshold power level may be selected, and the portion of the channel impulse response 600 that exceeds the threshold power level may be designated as the reference multipath amount. In other words, for the example of FIG. 6A, the amount of multipath may be expressed as the duration of the channel impulse response 600 that exceeds the threshold power level. Portions of the channel impulse response 600 associated with later signal arrivals that fall below the threshold power level may be designated as noise samples. The amount of multipath determined from the channel impulse response 600 of FIG. 6A may be stored in the first device D1 (or another suitable device) and thereafter used to detect motion in the room 510 at other times.

In some implementations, the amount of multipath may be measured as the Root Mean Square (RMS) of channel delay (such as the duration of multipath longer than a threshold). It is noted that the duration of the multipath is the width (or time delay) of the entire channel impulse response 600; thus, although only portions of the channel impulse response 600 corresponding to the first arrival path are typically used when estimating angle information of wireless signals, the entire channel impulse response 600 may be used when detecting motion as disclosed herein. The threshold power level may be set according to either the power level of the strongest signal path power or to the noise power. The first device D1 may use the reference multipath amount determined at time T1 to detect motion in the room at one or more later times.

Figure 5B:
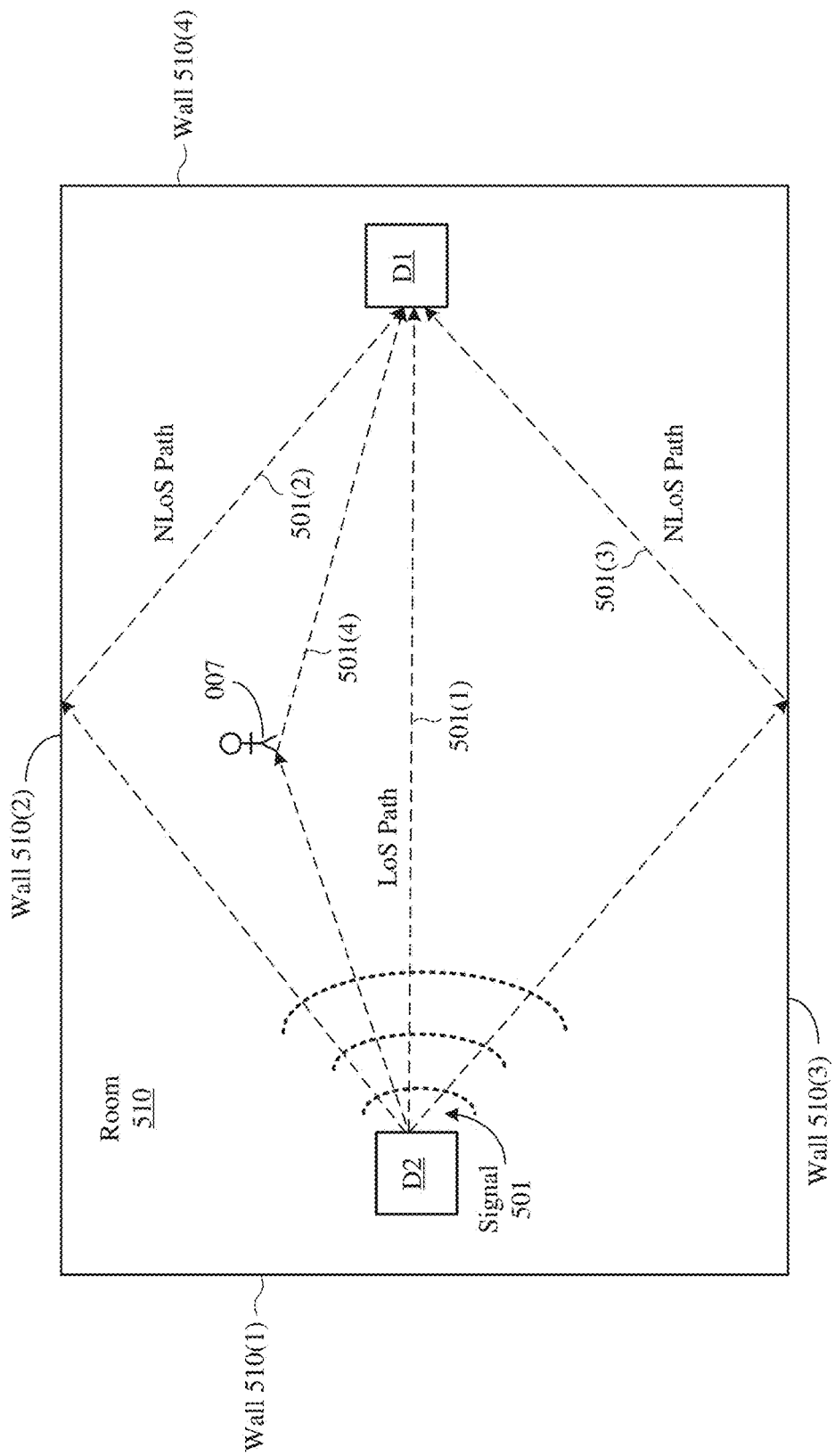
FIG. 5B shows an example transmission of a multipath wireless signal in the room of FIG. 5A with motion at a second time.

FIG. 5B shows an example transmission of a multipath wireless signal 501 in the room 510 of FIG. 5A with motion at a second time T2. As depicted in FIG. 5B, a person 007 entered the room 510 and resulting in at least one additional NLOS signal 501(4). The additional NLOS signal 501(4) resulting from the presence or movement of person 007 may change the channel conditions, for example, as compared to the channel conditions of the room 510 at the first time T1 (as depicted in FIG. 5A). In accordance with various aspects of the present disclosure, the first device D1 may use changes in estimated channel conditions between times T1 and T2 to detect motion in the room 510. More specifically, the first device D1 may estimate channel conditions based on the signal 501 of FIG. 5B (which includes the "new" NLOS signal 501(4)), and then compare the estimated channel conditions at the second time T2 with the reference channel conditions estimated at the first time T1.

Figure 6B:
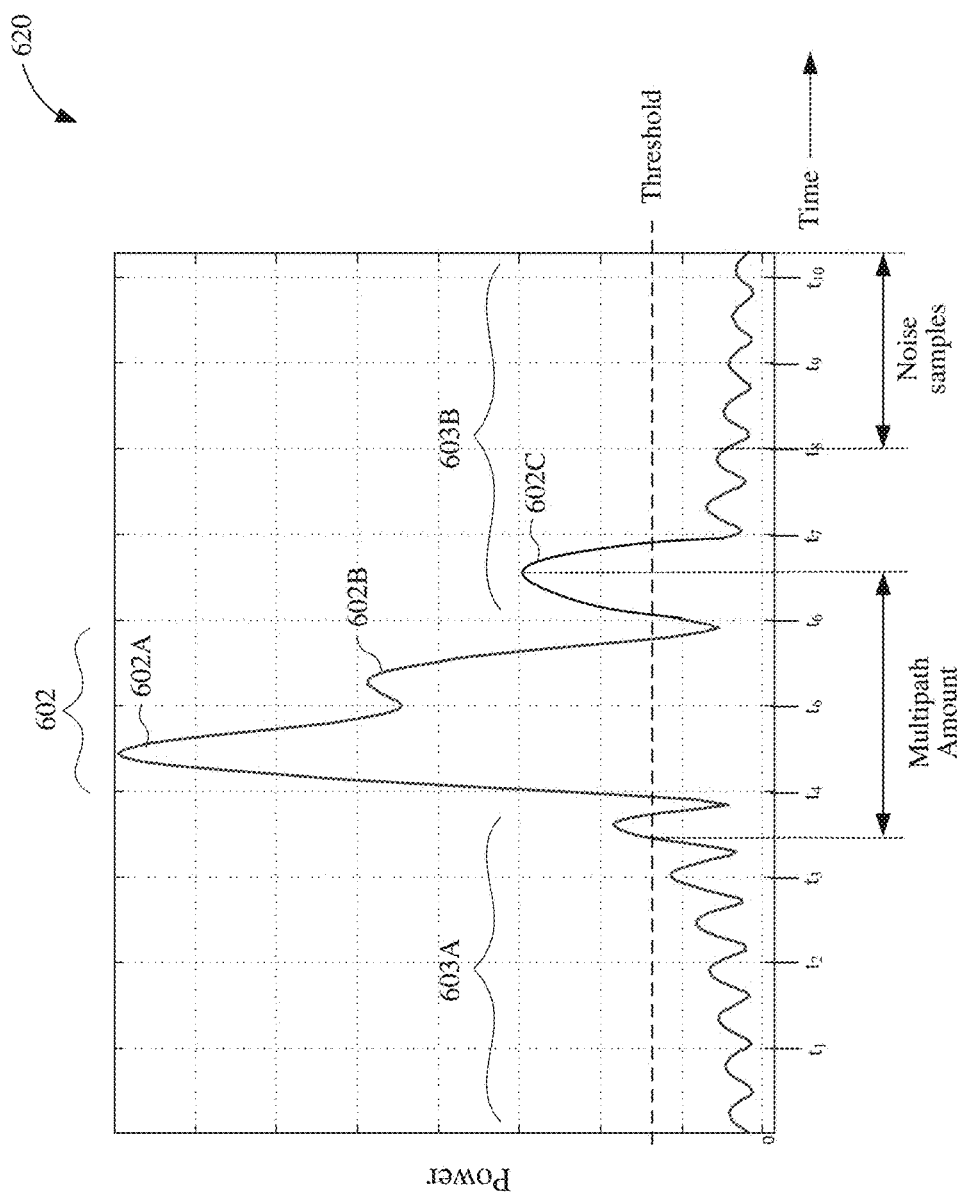
FIG. 6B shows an example channel impulse response of the multipath wireless signal of FIG. 5B.

FIG. 6B shows an example channel impulse response 620 of the wireless signal 501 of FIG. 5B. The channel impulse response 620 shown in FIG. 6B is similar to the channel impulse response 600 shown in FIG. 6A, except that the multipath amount in the channel impulse response 620 at time T2 is greater (such as having a longer duration) than the reference multipath amount in the channel impulse response 600 shown in FIG. 6A. Moreover, the channel impulse response 620 includes an extra peak 602C corresponding to the NLOS signal 501(4) caused by the presence of the person 007 in the room 510 depicted in FIG. 5B (as compared to the channel impulse response 600 of FIG. 6A). Thus, in some implementations, the change in multipath amount between time T1 and time T2 may be used to detect motion in the vicinity of the first device D1 (such as in the room 510).

Figure 5C:
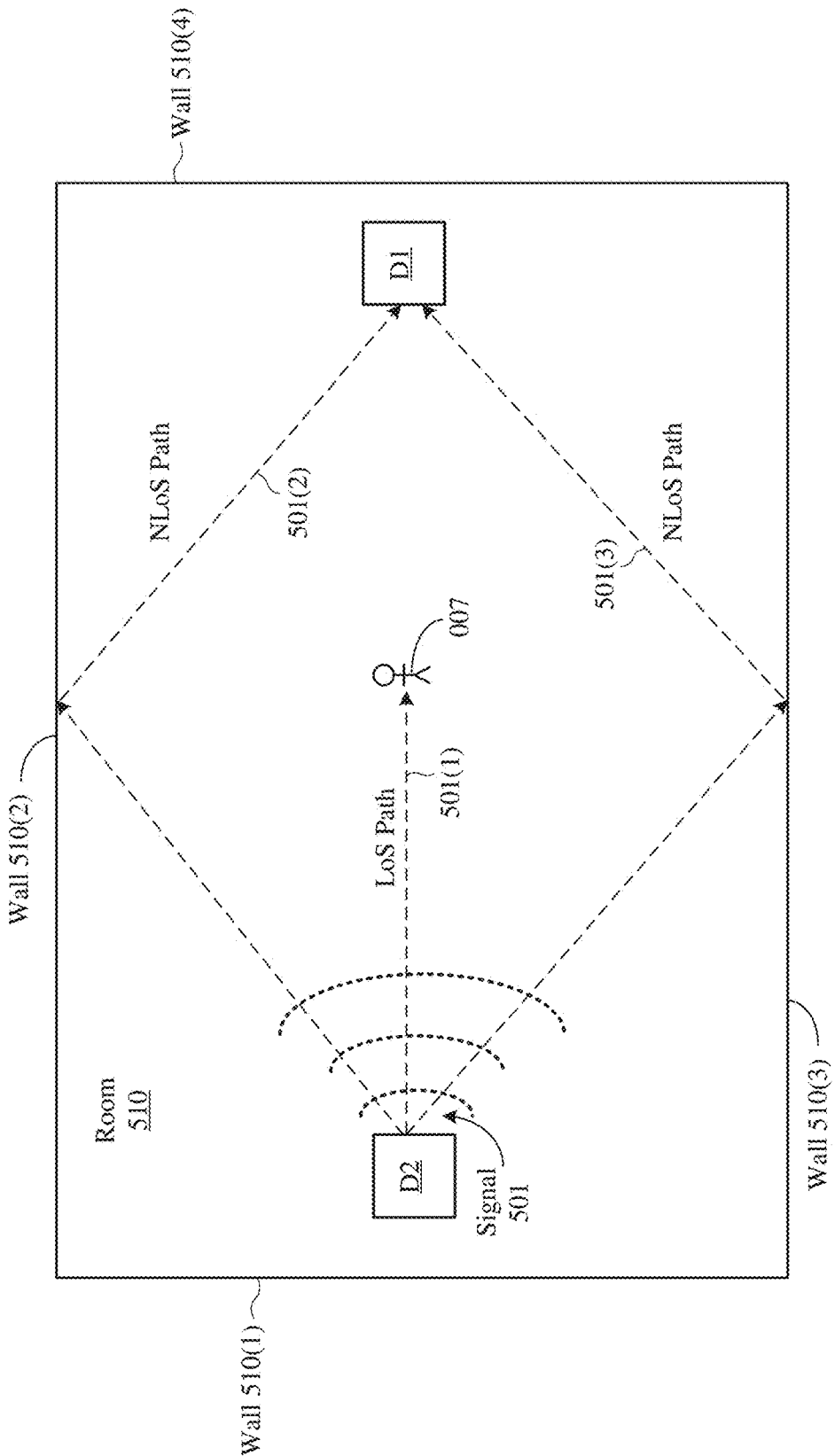
FIG. 5C shows another example transmission of a multipath wireless signal in the room of FIG. 5A with motion at a third time.

FIG. 5C shows another example transmission of a multipath wireless signal 501 in the room 510 of FIG. 5A at a third time T3. In the illustrated example, the person 007 obstructs the LOS signal 501(1). As shown in FIG. 5C, the location of the person 007 may prevent the wireless signal 501 from having a LOS signal component 501(1) that reaches the first device D1. The absence of the LOS signal component 501(1) may cause the channel conditions at time T3 to be different than the channel conditions at time T2 (see FIG. 5B) and to be different than the channel conditions at time T1 (see FIG. 5A). The first device D1 may use changes in estimated channel conditions between either times T1 and T3 or between times T2 and T3 (or a combination of both) to detect motion in the room 510. Thus, in some implementations, the first device D1 may estimate channel conditions based on the signal 501 of FIG. 5C, and then compare the estimated channel conditions at time T3 with the reference channel conditions estimated at time T1 to detect motion. Additionally or alternatively, in some implementations, the first device D1 may estimate channel conditions based on the signal 501 of FIG. 5C, and then compare the estimated channel conditions at time T3 with the channel conditions estimated at time T2 to detect motion.

In some other implementations, the first device D1 may use the first arrival path (FAP) of the channel impulse response 620 to detect motion when the person 007 blocks the LOS signal components, for example, as depicted in FIG. 5C. More specifically, the first device D1 may determine whether the power level of the FAP signal component has changed by more than a threshold value, for example, by comparing the absolute power level of the FAP signal component of the channel impulse response at time T1 with the power level of the FAP signal component of the channel impulse response at time T3. In some implementations, the first device D1 may compare the absolute power levels of the FAP between time T1 and time T3.

In some other implementations, the first device D1 may compare relative power levels of the FAP between time T1 and time T3. More specifically, the first device D1 may compare the power level of the FAP relative to the entire channel power level to determine a relative power level for the FAP signal components. By comparing relative power levels (rather than absolute power levels), the overall channel power may be normalized, for example, to compensate for different receive power levels at time T1 and time T3. For example, even though the person 007 is not obstructing the LOS signal 501(1) at time T2 (see FIG. 5B), the overall receive power level may be relatively low (such as below a first value). Conversely, even though the person 007 obstructs the LOS signal 501(1) at time T3 (see FIG. 5C), the overall power level may be relatively high (such as higher than a second value greater than the first value). In addition, or in the alternative, the first device D1 may base a detection of motion on comparisons between FAP power levels and comparisons of multipath amounts.

In some other implementations, the first device D1 may compare the shapes of channel impulse responses determined at different times to detect motion. For example, the first device D1 may compare the shape of channel impulse response 600 (determined at time T1) with the shape of channel impulse response 620 (determined at time T2) by determining a correlation between the channel impulse responses 600 and 620. In some such implementations, the first device D1 uses a covariance matrix to determine the correlation between the channel impulse responses 600 and 620. In some other implementations, the first device D1 may perform a sweep to determine a correlation between a number of identified peaks of the channel impulse response 600 and a number of identified peaks of the channel impulse response 620, and then determine whether the identified peaks of the channel impulse response 600 are greater in power than the identified peaks of the channel impulse response 620. Further, if motion is detected, the first device D1 may trigger additional motion detection operations to eliminate false positives and/or to update reference information (such as the reference multipath amount).

In some implementations, the first device D1 may solicit the transmission of one or more wireless signals from the second device D2, for example, rather than waiting to receive wireless signals transmitted from another device (such as the second device D2 in the examples of FIGS. 5A-5C). In some such implementations, the first device D1 may initiate a transmission of a Bluetooth (for example, BLE) message having a supplemental information appended thereto from the second device D2, and use the sequence contained in the supplemental information 320 to estimate channel conditions, estimate angle information, or both.

Figure 7A:
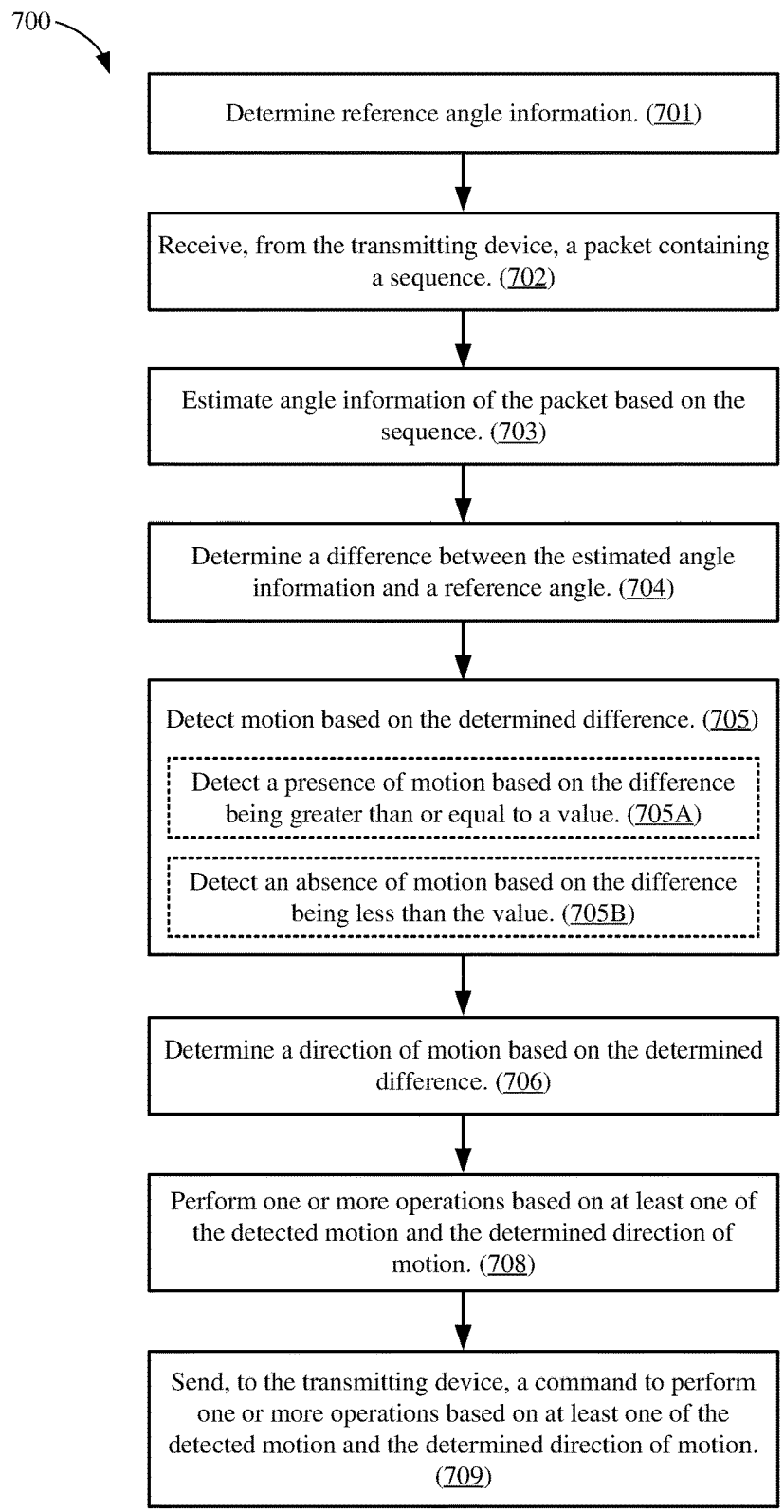
FIG. 7A is a flow chart depicting an example operation for detecting motion using wireless signals.

FIG. 7A is a flow chart depicting an example operation 700 for detecting motion using wireless signals. For purposes of discussion herein, a transmitting device may transmit a wireless signal to a receiving device, and the receiving device may estimate angle information (such as AoA and AoD values) of the wireless signal. The transmitting device may be any suitable wireless device including, for example, one of the IoT devices 110a-110d of FIG. 1 or the IoT device 200 of FIG. 2. Similarly, the receiving device may be any suitable wireless device including, for example, one of the IoT devices 110a-110d of FIG. 1 or the IoT device 200 of FIG. 2.

The receiving device may determine reference angle information (701). The reference angle information, which may include one or more reference AoA values, one or more reference AoD values, or one or more pairs of reference AoA and AoD values, may be stored in a memory of the receiving device. In some implementations, the reference angle information may be determined prior to the motion detection operation during one or more calibration operations. In other implementations, the reference angle information may be determined based on angle information estimated in a number of previous motion detection operations.

The receiving device may receive, from the transmitting device, a packet containing a sequence (702). In some implementations, the packet may be a Bluetooth packet, and the sequence may be contained in a supplemental information appended to the Bluetooth packet. As described above, in some implementations the Bluetooth packet may be a BLE packet. In other implementations, the packet may be transmitted according to another suitable wireless communication protocol, and the sequence may be any suitable known sequence or pattern from which angle information may be determined.

The receiving device may estimate angle information of the packet based on the sequence (703). In some implementations, the angle information may include an AoA value of the received packet. In other implementations, the angle information may include an AoD value of the received packet. In some other implementations, the angle information may include AoA and AoD values of the received packet.

The receiving device may determine a difference or differences between the estimated angle information and reference angle information (704). In some implementations, the receiving device may compare the estimated angle information with the reference angle information to determine the difference. For example, the receiving device may compare an estimated AoA value with a reference AoA value to determine an AoA difference value. As another example, the receiving device may compare an estimated AoD value with a reference AoD value to determine an AoD difference value. In some other implementations, the receiving device may compare estimated AoA and AoD values with reference AoA and AoD values to determine the difference(s) in angle information.

The receiving device may detect motion based on the determined difference (705). In some implementations, the receiving device may detect a presence of motion based on the difference being greater than or equal to a value (705A), and may detect an absence of motion based on the difference being less than the value (705B).

In some implementations, the receiving device also can determine a direction of motion based on the determined difference (706). In some such implementations, the receiving device may determine the direction of motion based on changes in estimated angle information of a number of packets over a time period. For example, the receiving device may receive a first packet containing a first sequence at a first time, and may receive a second packet containing a second sequence at a second time. The receiving device may determine first angle information for the first packet and may determine second angle information for the second packet. The receiving device may determine a change in angle information between the first and second times, for example, by determining a difference between the first angle information and the second angle information. Then, the receiving device may determine a direction of motion based on the determined difference in angle information.

In some implementations, the receiving device may perform one or more operations based on at least one of the detected motion and the determined direction of motion (708). In some aspects, the one or more operations may be based on the detected motion. For example, when the receiving device is a smart TV and the transmitting device is a remote control, the receiving device may turn itself on based on detecting a presence of motion, and may turn itself off based on detecting an absence of motion.

In addition, or in the alternative, the receiving device may send, to the transmitting device, a command to perform one or more operations based on at least one of the detected motion and the determined direction of motion (709). In some implementations, the command may be based on the detected motion. For example, when the receiving device is a remote control and the transmitting device is a smart TV, the receiving device may send a command to turn on the smart TV based on detecting a presence of motion, and may send a command to turn off the smart TV based on detecting an absence of motion.

In some other implementations, the command may be based on both the detection of motion and the determined direction of motion. For one example, if the receiving device is a smart TV and the transmitting device is a remote control, the receiving device may turn itself on based on an indication that a person is walking towards the vicinity of the receiving device, and may turn itself off based on an indication that a person is walking away from the vicinity of the receiving device. For another example, if the receiving device is a remote control and the transmitting device is a smart TV, the receiving device may send a command to turn on the smart TV based on an indication that a person is walking towards the vicinity of the smart TV, and may send a command to turn off the smart TV based on an indication that a person is walking away from the vicinity of the smart TV.

Figure 7B:
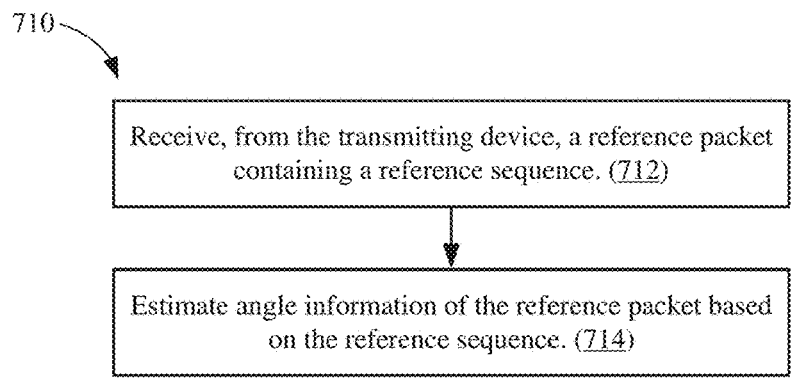
FIG. 7B is a flow chart depicting an example operation for determining a reference angle.

FIG. 7B is a flow chart depicting an example operation 710 for determining reference angle information. The receiving device may receive, from the transmitting device, a reference packet containing a reference sequence (712). The receiving device may estimate angle information of the reference packet based on the reference sequence (714). Thereafter, the receiving device may use the estimated angle information of the reference packet as the reference angle information. As discussed above, the reference angle information may include an AoA value of the reference packet, an AoD value of the reference packet, or both. In some implementations, the reference angle information may be based on a plurality of estimated AoA and/or AoD values determined for a corresponding plurality of reference packets received from the transmitting device. In some implementations, the plurality of reference packets may be received during a single calibration operation. In some other implementations, the plurality of reference packets may be received during multiple calibration operations. In still other implementations, one or more of the reference angle information may be determined during a number of previous motion detection operations (such as rather than during calibration operations). Further, in at least some implementations, the reference angle information may be stored in a memory of the receiving device.

Figure 7C:
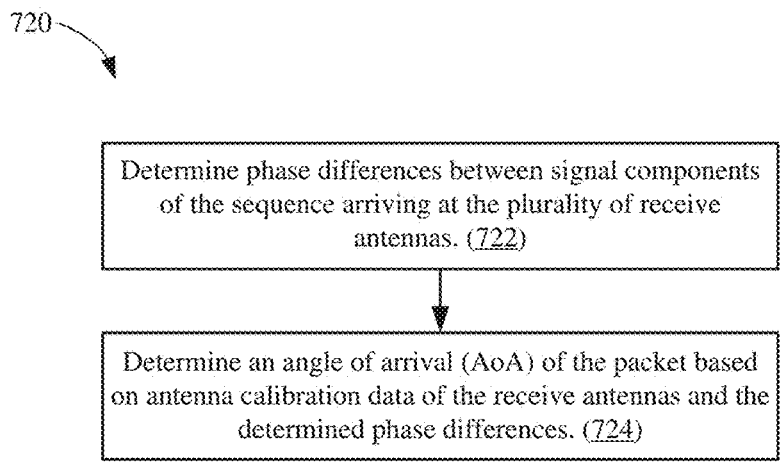
FIG. 7C is a flow chart depicting an example operation for estimating AoA information.

FIG. 7C is a flow chart depicting an example operation 720 for estimating angle of arrival (AoA) information. The receiving device may determine phase differences between signal components of the sequence arriving at the plurality of receive antennas (722) and may determine an angle of arrival (AoA) of the packet based at least in part on the determined phase differences (724). In some implementations, the receiving device may use multiple antennas to receive a packet having appended thereto a supplemental information containing the sequence. For example, referring also to the example of FIG. 3B, the receiving device D1 uses four receive antennas RA1-RA4 to receive the Bluetooth packet 310 and its supplemental information 320 transmitted from the transmitting device D2. Because antenna calibration data for the four receive antennas RA1-RA4 (which may indicate, among other things, the distance between each of the four receive antennas RA1-RA4) is known to the receiving device D1, the receiving device D1 may determine phase differences between signal components of the sequence contained in the supplemental information 320 arriving at its four receive antennas RA1-RA4, and use the known antenna calibration data of the receive antennas RA1-RA4 and the determined phase differences to estimate AoA information of the Bluetooth packet 310.

Figure 7D:
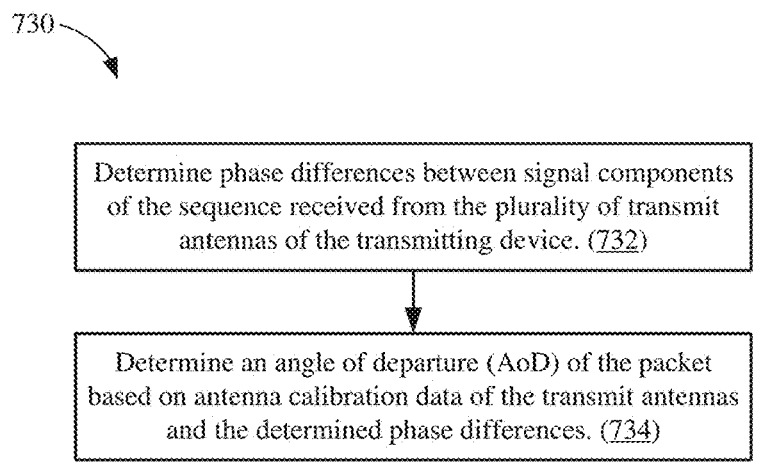
FIG. 7D is a flow chart depicting an example operation for estimating AoD information.

FIG. 7D is a flow chart depicting an example operation 730 for estimating angle of departure (AoD) information. The receiving device may determine phase differences between signal components of the sequence transmitted from the plurality of transmit antennas of the transmitting device (732), and may determine an angle of departure (AoD) of the packet based at least in part on the determined phase differences (734). In some implementations, the transmitting device may use multiple antennas to transmit a packet having appended thereto a supplemental information containing the sequence. For example, referring also to the example of FIG. 3C, the transmitting device D1 uses four transmit antennas TA1-TA4 to transmit the Bluetooth packet 310 and its supplemental information 320 to the receiving device D2. The receiving device D2 may determine phase differences between signal components of the sequence transmitted from the four transmit antennas TA1-TA4 of the transmitting device D1. The receiving device D2 may receive antenna calibration data for the four transmit antennas TA1-TA4 from the transmitting device D1, and use the antenna calibration data of the transmit antennas TA1-TA4 and the determined phase differences to estimate AoD information of the Bluetooth packet 310. The antenna calibration data for the four transmit antennas TA1-TA4 may indicate, among other things, the distance between each of the four transmit antennas TA1-TA4.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An apparatus, comprising:
   one or more transceivers configured to receive wireless signals from a transmitting device via a plurality of receive antennas;
   one or more processors; and
   a memory comprising instructions that, when executed by the one or more processors, cause the apparatus to:
   receive, from the transmitting device, a reference packet containing a reference sequence;
   determine phase differences between signal components of the reference sequence arriving via the plurality of receive antennas;
   determine a reference angle based at least in part on the determined phase differences;
   receive, from the transmitting device, a wireless signal via the plurality of receive antennas, the wireless signal including a packet containing a sequence known by the apparatus;
   determine phase differences between signal components of the sequence arriving via the plurality of receive antennas;
   determine at least one of an angle of arrival (AoA) or an angle of departure (AoD) of the packet based at least in part on the determined phase differences;
   determine a difference between at least one of the AoA or the AoD and the reference angle; and
   detect a presence or absence of motion of an object other than the apparatus or the transmitting device in the vicinity of the apparatus and the transmitting device based on the determined difference.

2. The apparatus of claim 1, wherein execution of the instructions to detect motion causes the apparatus to:
   detect the presence of motion based on the difference being greater than or equal to a value; and
   detect the absence of motion based on the difference being less than the value.

3. The apparatus of claim 1, wherein the packet comprises a Bluetooth packet, and the sequence is contained in a supplemental information appended to the Bluetooth packet.

4. The apparatus of claim 1, wherein the sequence comprises a plurality of tones and wherein execution of the instructions further causes the apparatus to:
   switch signal reception operations between the plurality of receive antennas based on an antenna switching schedule.

5. The apparatus of claim 1, wherein the sequence is received from a plurality of transmit antennas of the transmitting device, wherein the sequence comprises a plurality of tones, and wherein execution of the instructions causes the apparatus to:
  receive an antenna switching schedule from the transmitting device; and
  determine from which of the plurality of transmit antennas each of the tones is transmitted based at least in part on the antenna switching schedule.

6. The apparatus of claim 1, wherein execution of the instructions further causes the apparatus to:
  determine a direction of motion of the object based at least in part on the determined difference.

7. The apparatus of claim 6, wherein execution of the instructions further causes the apparatus to:
  perform one or more operations based on at least one of the detected motion and the determined direction of motion.

8. A method of motion detection using wireless signals, the method performed by a receiving device and comprising:
  receive, from a transmitting device, a reference packet containing a reference sequence;
  determine phase differences between signal components of the reference sequence arriving via a plurality of receive antennas;
  determine a reference angle based at least in part on the determined phase differences;
  receiving, from the transmitting device via the plurality of receive antennas, a packet containing a sequence known by the receiving device;
  determining phase differences between signal components of the sequence arriving via the plurality of receive antennas;
  determining at least one of an angle of arrival (AoA) or an angle of departure (AoD) of the packet based at least in part on the determined phase differences;
  determining a difference between at least one of the AoA or the AoD and the reference angle; and
  detecting a presence or absence of motion of an object other than the receiving device or the transmitting device in the vicinity of the receiving device and the transmitting device based on the determined difference.

9. The method of claim 8, wherein the detecting comprises:
  detecting the presence of motion based on the difference being greater than or equal to a value; and
  detecting the absence of motion based on the difference being less than the value.

10. The method of claim 8, wherein the packet comprises a Bluetooth packet, and the sequence is contained in a supplemental information appended to the Bluetooth packet.

11. The method of claim 8, wherein the sequence comprises a plurality of tones, and the method further comprises:
  switching signal reception operations between the plurality of receive antennas based on an antenna switching schedule.

12. The method of claim 8, wherein the sequence is received from a plurality of transmit antennas of the transmitting device, wherein the sequence comprises a plurality of tones, and wherein the method further comprises:
  receiving an antenna switching schedule from the transmitting device; and
  determining from which of the plurality of transmit antennas each of the tones is transmitted based at least in part on the antenna switching schedule.

13. The method of claim 8, further comprising:
  determining a direction of motion of the object based at least in part on the determined difference.

14. The method of claim 13, further comprising:
  performing one or more operations based on at least one of the detected motion and the determined direction of motion.

15. A non-transitory computer-readable medium comprising instructions that, when executed by one or more processors of a receiving device, cause the receiving device to perform operations comprising:
  receiving, from a transmitting device, a reference packet containing a reference sequence;
  determine phase differences between signal components of the reference sequence arriving via a plurality of receive antennas;
  determine a reference angle based at least in part on the determined phase differences;
  receiving, from the transmitting device via the plurality of receive antennas, a packet containing a sequence known by the receiving device;
  determining phase differences between signal components of the sequence arriving via the plurality of receive antennas;
  determining at least one of an angle of arrival (AoA) or an angle of departure (AoD) of the packet based at least in part on the determined phase differences;
  determining a difference between at least one of the AoA or the AoD and the reference angle; and
  detecting a presence or absence of motion of an object other than the receiving device or the transmitting device in the vicinity of the receiving device and the transmitting device based on the determined difference.

16. The non-transitory computer-readable medium of claim 15, wherein execution of the instructions for detecting motion causes the receiving device to perform operations further comprising:
  detecting the presence of motion based on the difference being greater than or equal to a value; and
  detecting the absence of motion based on the difference being less than the value.

17. The non-transitory computer-readable medium of claim 15, wherein the packet comprises a Bluetooth packet, and the sequence is contained in a supplemental information appended to the Bluetooth packet.

18. The non-transitory computer-readable medium of claim 15, wherein execution of the instructions causes the receiving device to perform operations further comprising:
  determining a direction of motion of the object based at least in part on the determined difference.

19. The non-transitory computer-readable medium of claim 18, wherein execution of the instructions causes the receiving device to perform operations further comprising:
  performing one or more operations based on at least one of the detected motion and the determined direction of motion.

20. A receiving device, comprising:
  means for receiving, from a transmitting device, a reference packet containing a reference sequence;
  means for determining phase differences between signal components of the reference sequence arriving via a plurality of receive antennas;
  means for determining a reference angle based at least in part on the determined phase differences;
  means for receiving, from the transmitting device via the plurality of receive antennas, a packet containing a sequence known by the receiving device;

means for determining phase differences between signal components of the sequence arriving via the plurality of receive antennas;

means for determining at least one of an angle of arrival (AoA) or an angle of departure (AoD) of the packet based at least in part on the determined phase differences;

means for determining a difference between at least one of the AoA or the AoD and the reference angle; and means for detecting a presence or absence of motion of an object other than the receiving device or the transmitting device in the vicinity of the receiving device and the transmitting device based on the determined difference.

21. The receiving device of claim 20, wherein the means for detecting is to:

detect the presence of motion based on the difference being greater than or equal to a value; and detect the absence of motion based on the difference being less than the value.

22. The receiving device of claim 20, wherein the packet comprises a Bluetooth packet, and the sequence is contained in a supplemental information appended to the Bluetooth packet.

23. The receiving device of claim 20, wherein the sequence comprises a plurality of tones and wherein the receiving device further comprises:

means for switching signal reception operations between the plurality of receive antennas based on an antenna switching schedule.

24. The receiving device of claim 20, wherein the sequence is received from a plurality of transmit antennas of the transmitting device, wherein the sequence comprises a plurality of tones, and wherein the receiving device further comprises:

means for receiving an antenna switching schedule from the transmitting device; and means for determining from which of the plurality of transmit antennas each of the tones is transmitted based at least in part on the antenna switching schedule.

25. The receiving device of claim 20, wherein the receiving device further comprises:

means for determining a direction of motion of the object based at least in part on the determined difference.

26. The receiving device of claim 25, wherein the receiving device further comprises:

means for performing one or more operations based on at least one of the detected motion and the determined direction of motion.

\* \* \* \* \*